(12) United States Patent
Nagata

(10) Patent No.: US 7,400,374 B2
(45) Date of Patent: Jul. 15, 2008

(54) LIQUID CRYSTAL DISPLAY DEVICE HAVING BLACK AND TRANSPARENT SPACERS IN THE TRANSMISSIVE REGION

(75) Inventor: Yasunari Nagata, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 269 days.

(21) Appl. No.: 11/140,547

(22) Filed: May 26, 2005

(65) Prior Publication Data

US 2006/0017870 A1  Jan. 26, 2006

(30) Foreign Application Priority Data

| May 28, 2004 | (JP) | ............................. 2004-160096 |
| May 28, 2004 | (JP) | ............................. 2004-160103 |
| Jun. 29, 2004 | (JP) | ............................. 2004-191225 |
| Feb. 25, 2005 | (JP) | ............................. 2005-051973 |

(51) Int. Cl.
  *G02F 1/1339* (2006.01)
(52) U.S. Cl. .................. 349/157; 349/114; 349/155
(58) Field of Classification Search ................ 349/114, 349/155–157
  See application file for complete search history.

(56) References Cited

U.S. PATENT DOCUMENTS

| 5,142,395 A | * | 8/1992 | Yamazaki et al. ........... 349/157 |
| 5,389,288 A | * | 2/1995 | Rindo et al. ........... 252/299.01 |
| 5,969,784 A | * | 10/1999 | Miyazaki et al. ............. 349/155 |
| 6,535,264 B1 | * | 3/2003 | Imabayashi et al. ......... 349/155 |
| 6,624,860 B1 | * | 9/2003 | Narutaki et al. ............. 349/106 |
| 2004/0095545 A1 | * | 5/2004 | Washizawa et al. ......... 349/155 |

FOREIGN PATENT DOCUMENTS

| JP | 07-318929 | 12/1995 |
| JP | 08-292413 | 11/1996 |
| JP | 2003-186025 | 7/2003 |

OTHER PUBLICATIONS

Chinese office action for corresponding Chinese application No. 200510073900 lists the references above.

* cited by examiner

*Primary Examiner*—Andrew Schechter
*Assistant Examiner*—Matthew Tynan
(74) *Attorney, Agent, or Firm*—Hogan & Hartson LLP

(57) ABSTRACT

In a semi-transmissive liquid crystal display device provided with a liquid crystal panel DP and a backlight BL, black spacers and transparent spacers are mixed and provided in a space between two opposing transparent substrates 4a and 4b, and let r be a radius of the spacers and S be a dimension of a light transmissive region T in a single pixel, then a value of $\pi r^2/S$ is set in a range from 0.001 to 0.01. A stable display is thus enabled by eliminating display irregularities.

10 Claims, 6 Drawing Sheets

(A-A)

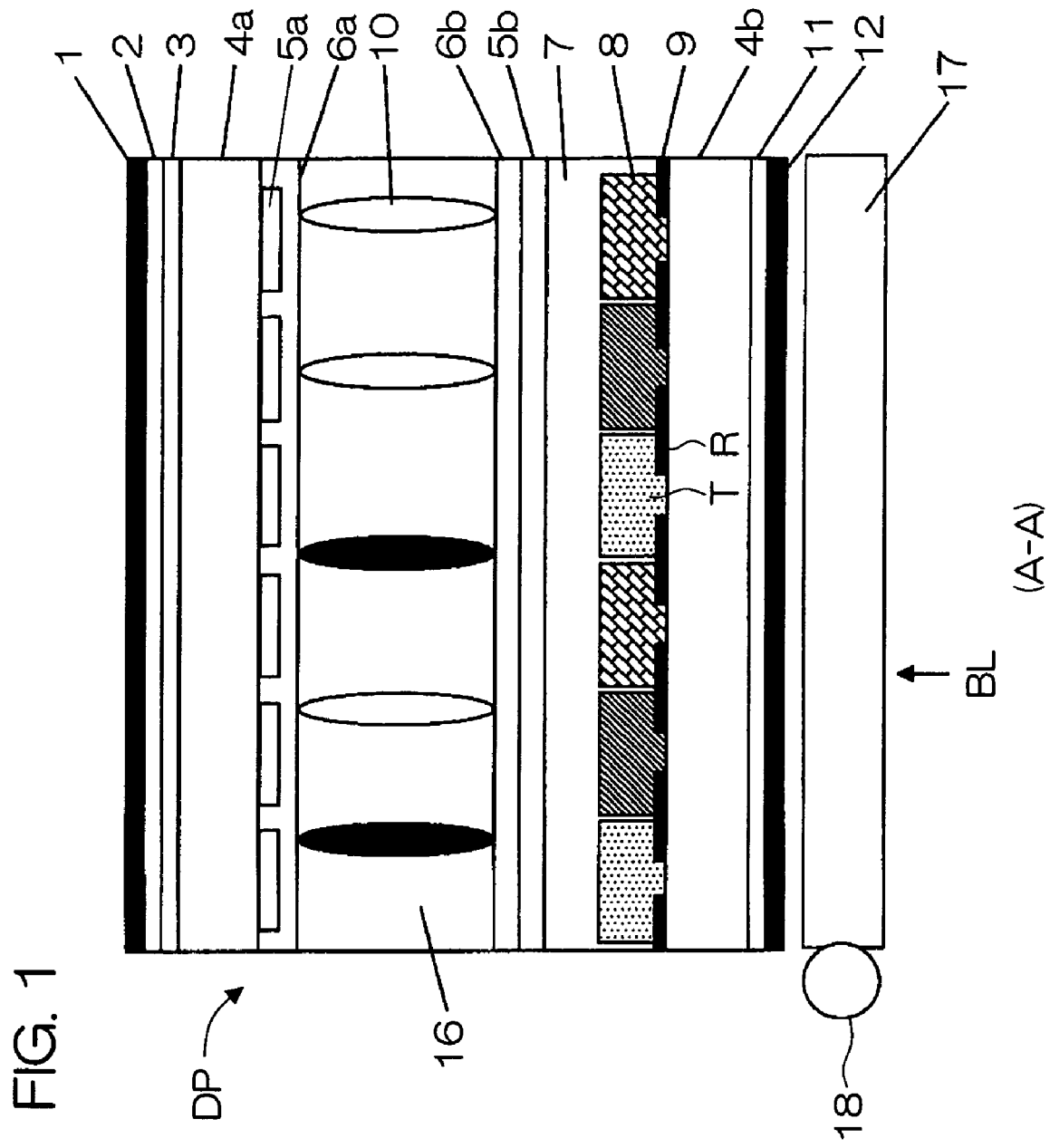

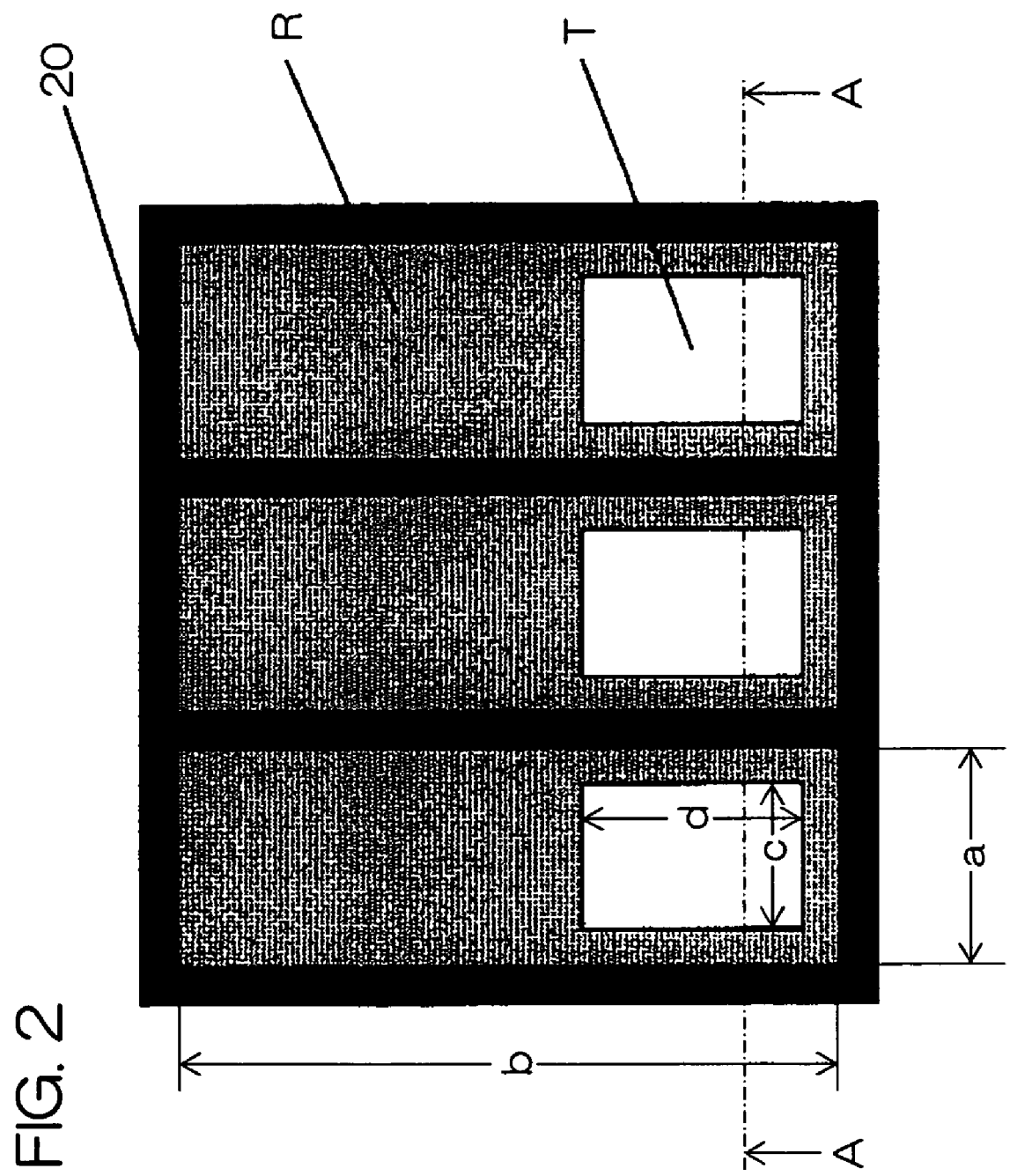

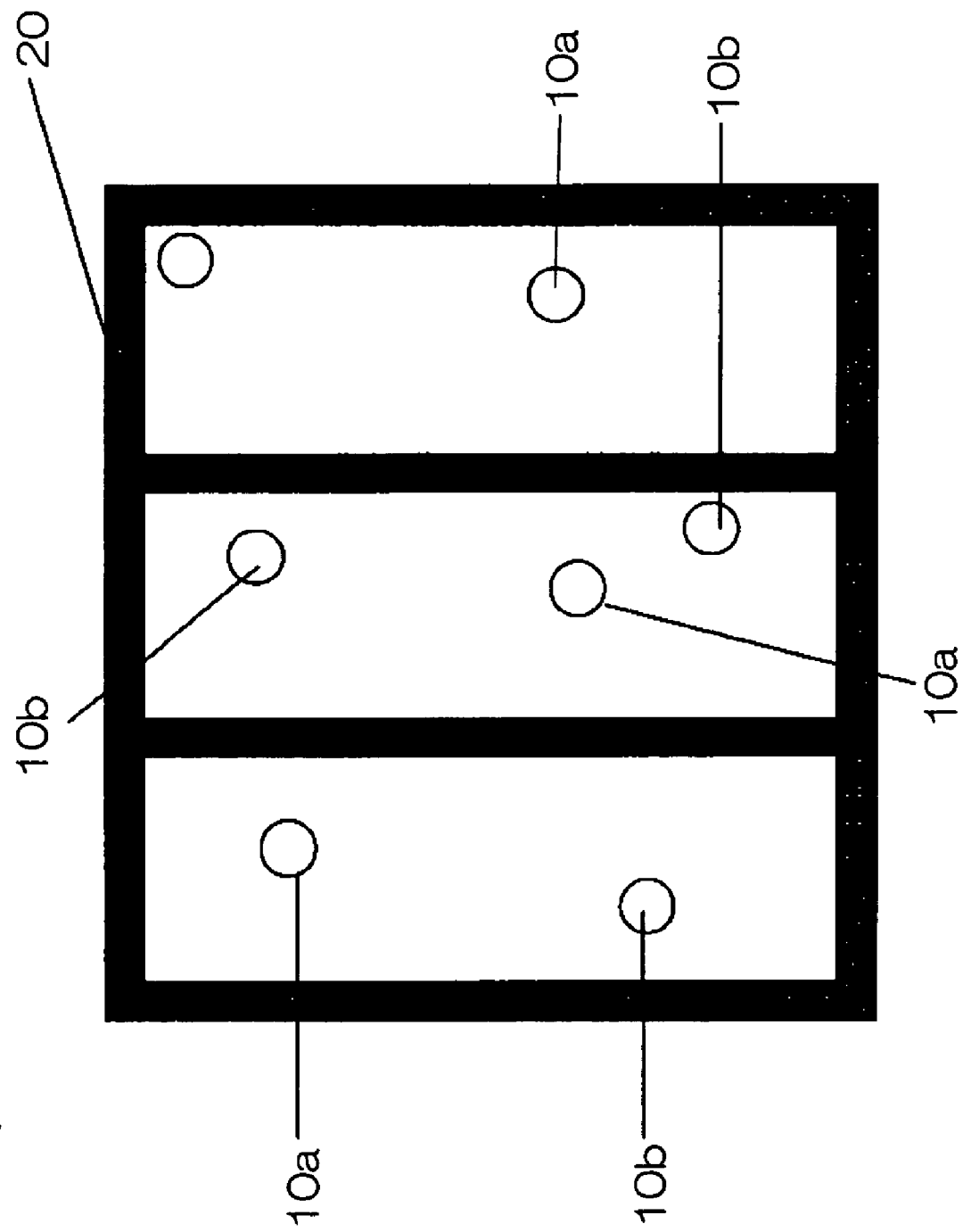

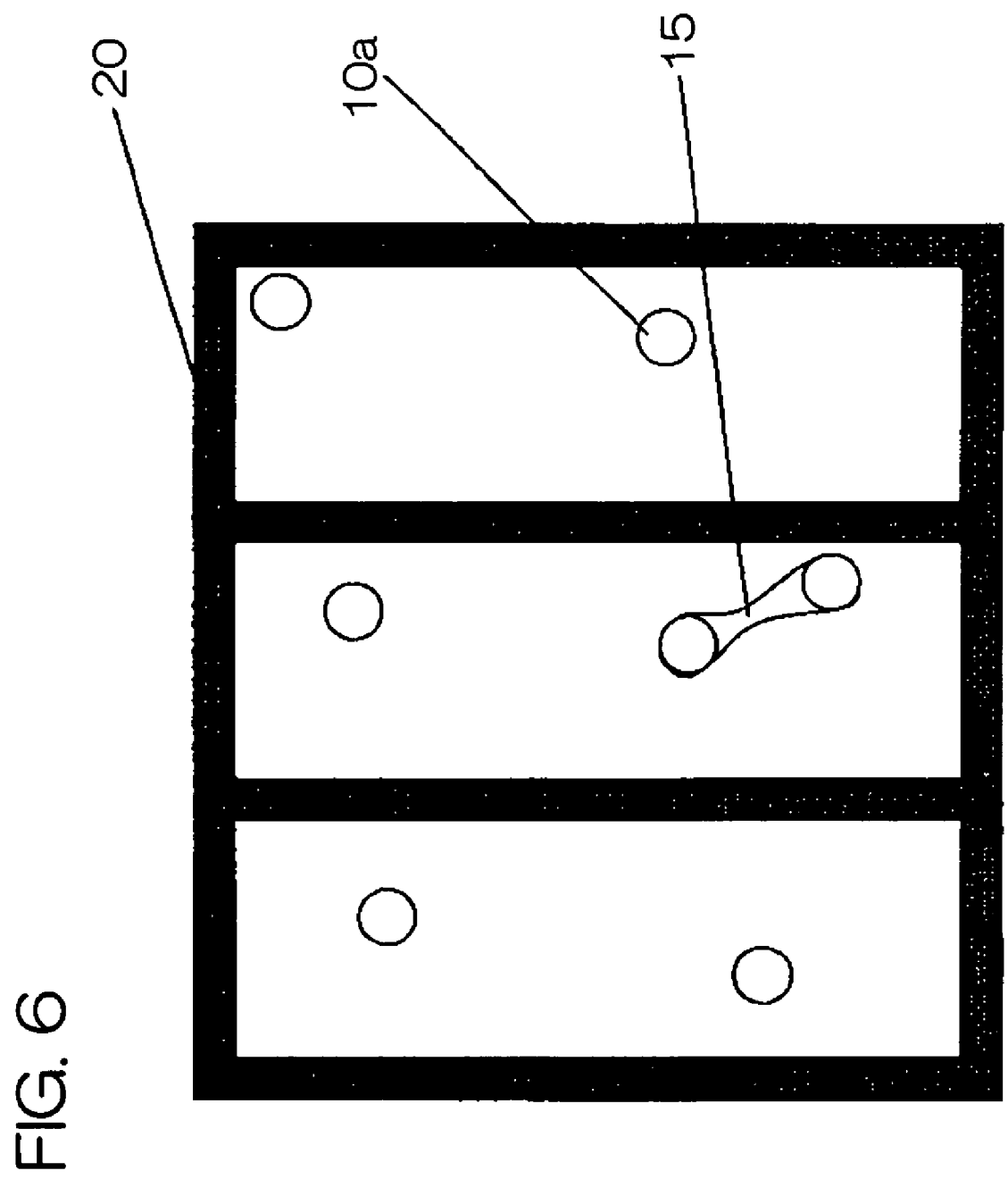

LIQUID CRYSTAL DISPLAY DEVICE HAVING BLACK AND TRANSPARENT SPACERS IN THE TRANSMISSIVE REGION

BACKGROUND OF THE INVENTION

1. Field of the Invention

The present invention relates to a semi-transmissive liquid crystal display device having a light reflective region and a light transmissive region in a single pixel region, and more particularly, to the structure of a spacer that defines an interval between a pair of top and bottom substrates.

2. Description of Related Art

In recent years, a liquid crystal display device has been used extensively as a large-scale, high-definition monitor besides a small- or medium-scale personal digital assistant and a notebook computer.

A display mode of the liquid crystal display device includes a reflective mode in which display is performed using external light that comes incident on the display surface, a transmissive mode in which a backlight is used and display is performed by allowing light from the backlight to pass through the display surface, and a semi-transmissive mode furnished with the functions of both modes.

A semi-transmissive liquid crystal display device achieving the semi-transmissive mode is used as a reflective device with the use of external illumination, such as sunlight or fluorescent light, or is used as a transmissive device by attaching a backlight. In order to provide the display functions of both types, it uses a semi-transmissive film (structured to serve as a half mirror by laminating plural dielectric films having different refractive indexes alternately).

When such a semi-transmissive film serving as a half mirror is used, it is difficult to enhance both functions of reflectance and transmittance.

In order to solve this problem, a semi-transmissive liquid crystal display device is assembled by forming a reflection film in a pixel region and providing a light transmission hole (light transmissive region) in part of the reflection film formed in the pixel region for allowing light from the backlight to pass through.

Meanwhile, it is quite important for the liquid crystal display device to keep a liquid crystal layer uniform at a thickness of a specific value. Hence, in general, a number of fine, transparent spacers to keep the liquid crystal layer at a uniformed thickness are mixed in the liquid crystal layer.

For this reason, in a semi-transmissive liquid crystal device, for example, when black is displayed in a transmissive mode (a display state where transmitted light is shielded), white dropouts readily occur due to the transparent spacers per se and an alignment defect of the liquid crystal on the periphery of the spacers. This is because while liquid crystal molecules are in a twisted state in a space between two substrates, those on the periphery of the spacers go into a state where they apparently stand perpendicularly in the space between the two substrates, and the twisted state of the liquid crystal molecules on the periphery of the spacers is thereby disturbed, which gives rise to a light leaking phenomenon in the liquid crystal layer near the spacer surface.

In addition, spacers provided in a space between two substrates are transparent, and provided on a random basis by means of wet scattering or dry scattering. Hence, the number of spacers provided above the light transmission hole is not constant.

Because a degree of white dropouts in each pixel depends on the number of spacers provided above the light transmission hole, white dropout portions across the entire display region appear as irregularities.

It is possible to prevent the white dropouts caused by a defect of liquid crystal alignment as described above by using spacers (hydrophilic spacers) having undergone treatment to form alkyl groups on the spacer surface. However, because only part of the pixel contributes to a transmissive display in the transmissive mode, the size of the pixel becomes relatively small with respect to the size of the spacers. Hence, when white is displayed on the contrary (a display state where transmitted light is allowed to pass through), black irregularities, by contrast, appear across the entire display region when an alignment restraining force is too strong.

In the semi-transmissive liquid crystal display device having both the light reflective region and the light transmissive region in the pixel region, display irregularities occur after all either in the black display or in the white display.

When the liquid crystal display device is formed using the hydrophilic spacers, leakage of light from the periphery of the spacers can be prevented. However, there arises another problem that an alignment defect of liquid crystal molecules occurs between close spacers.

In order to keep the liquid crystal layer uniform, the necessary mixing density of spacers is 80 or more pieces per 1 $mm^2$ when viewed in a plane, and in order to maintain the liquid crystal layer in a stable manner, a density of 200 pieces per 1 $mm^2$ is necessary. However, when hydrophilic spacers are mixed at a high density, an alignment defect of liquid crystal molecules between spacers becomes noticeable.

FIG. 6 is a plan view of pixel regions showing an inconvenience caused by a defective liquid crystal alignment between hydrophilic spacers.

Hydrophilic spacers 10a are provided in the respective pixel regions. The base material of the spacers is formed by subjecting a monomer having unsaturated ethylene groups to suspension polymerization using a radical polymerizing agent. Polymerization treatment to polymerize alkyl groups (having about 12 carbons) on the surface of the base material of the spacers is applied as hydrophilic treatment.

As a consequence, when the spacers 10a to surfaces of which is applied hydrophilic treatment are provided, because a restraining force to align liquid crystal is exerted on the surface of each spacer 10a, a linear alignment defect region having close spacers as a nucleus as is denoted by numeral 15 may possibly occur due to an external force or stress, such as heat, in a portion where spacers are close to each other. Because there is no phase difference in this linear alignment defect region 15, it becomes a luminous spot in the black display.

Conversely, when a scattering density of spacers is reduced to control the linear alignment defects, the thickness of the liquid crystal layer becomes less uniform. The liquid crystal molecules in the liquid crystal layer then become unable to move stably, which results in a problem that liquid crystal display is disturbed.

An object of the invention is to provide a semi-transmissive liquid crystal display device using a reflection film provided with light transmission holes that is capable of performing a stable display by eliminating display irregularities caused by spacers mixed in the liquid crystal layer.

An object of the invention is to provide a liquid crystal display device capable of performing a stable display while suppressing linear alignment defects having spacers as a nucleus that occur between close spacers.

SUMMARY OF THE INVENTION

A liquid crystal display device of the invention includes: a first substrate, on a display surface side, provided with a transparent conducting film and an alignment film; a second substrate disposed oppositely to the first substrate on a back surface side and provided with a transparent conducting film and an alignment film; a liquid crystal layer filled in a space between the two substrates; a reflection film provided on the second substrate; plural spacers provided in the liquid crystal layer; and a backlight that supplies light to the pixel regions via the second substrate. The reflection film has a light reflective region and a light transmissive region provided with a light transmission hole for each pixel region, and light transmittance of the plural spacers provided in the light transmissive region is in a range from 20 to 80%.

According to this configuration, it is possible to achieve a highly stable liquid crystal display device having an excellent spacer scattering property and capable of effectively preventing white dropouts in the black display, black dropouts in the white display, and a defective alignment of liquid crystal molecules caused by pressing particularly in the light transmissive region, while achieving high visual recognition without causing any display irregularity.

Also, a liquid crystal display device of the invention includes: a first substrate, on a display surface side, provided with a transparent conducting film and an alignment film; a second substrate disposed oppositely to the first substrate on a back surface side and provided with a transparent conducting film and an alignment film; a liquid crystal layer filled in a space between the two substrates; a reflection film provided on the second substrate; plural spacers provided on the liquid crystal layer; and a backlight that supplies light to the pixel regions via the second substrate. The reflection film has a light reflective region and a light transmissive region provided with a light transmission hole for each pixel region. Let r be a radius of the spacers and S be an area of the light transmissive region, and then $\pi r^2/S$ is set in a range from 0.001 to 0.01. Thus, white dropout portions across the entire display region will not appear as irregularities in the black display in the transmissive mode, which improves visual recognition. In addition, because the black spacers are not noticeable in the light transmissive region, it is possible to maintain a display at high visual recognition.

Black spacers and transparent spacers are included, and a mixing ratio thereof is set in a range from 20:80 to 80:20. In this case, semi-transparent spacers may be further included. When configured in this manner, the liquid crystal display device has no roughness in the white display, no roughness in the black display, and no irregularities of spacers in the color display.

The spacers may be formed of semi-transparent spacers.

Part of or all the black spacers may be spacers subjected to hydrophilic treatment, each being made of a black base material particle and a hydrophilic group film deposited on a surface of the particle. Because the hydrophilic group film is deposited on the surface of the black base material particle, a scattering property of the spacers is increased regardless of the absence or presence of the alkyl group film on the periphery. This not only prevents aggregation of the spacers in the display region, but also enables visual recognition to be maintained high.

Further, it is preferable that an alkyl group film having up to 11 to 13 carbons is formed and deposited on a surface of the hydrophilic group film. By forming the alkyl group film on the spacer surface, it is possible to prevent an event that alkyl groups formed on the surface of the spacer align liquid crystal molecules with their apparent cilia (needle-like cilia formed apparently on the spacer surface), which causes the liquid crystal molecules to be lined up to stand on the periphery of the spacer. This can prevent leakage of light from the periphery of the spacer.

In addition, a liquid crystal display device of the invention includes: a first substrate, on a display surface side, provided with a transparent conducting film and an alignment film; a second substrate disposed oppositely to the first substrate on a back surface side and provided with a transparent conducting film and an alignment film; a liquid crystal layer filled in a space between the two substrates; a reflection film provided on the second substrate; plural spacers provided on the liquid crystal layer; and a backlight that supplies light to the pixel regions via the second substrate. The plural spacers include spacers to surfaces of which is applied hydrophobic treatment and spacers to surfaces of which is applied hydrophilic treatment.

By mixing spacers to surfaces of which is applied hydrophobic treatment and spacers to surfaces of which is applied hydrophilic treatment, and providing the mixed spacers to the liquid crystal layer, a ratio of the spacers having undergone hydrophilic treatment can be reduced with respect to a total quantity of the spacers. Hence, not only is it possible to suppress a linear alignment defect between the spacers effectively, but it is also possible to maintain a density of the spacers to a specific value or above at the same time. This enables the thickness of the liquid crystal layer to be maintained uniformly in a stable manner.

It is preferable to set a mixing ratio of the spacers to surfaces of which is applied hydrophobic treatment and the spacers to surfaces of which is applied hydrophilic treatment in a range from 20:80 to 80:20.

The above and other objects, features, and advantages of the invention will become more apparent from the following description of embodiments with reference to the accompanying drawings.

BRIEF DESCRIPTION OF THE DRAWINGS

FIG. 1 is a schematic cross section of a liquid crystal display device of the invention;

FIG. 2 is a schematic plan view showing the structure of a reflection film used in the liquid crystal display device of the invention;

FIG. 5 is a plan view showing a state where two kinds of spacers (hydrophilic spacers and hydrophobic spacers) are provided in pixel portions of the liquid crystal display device of the invention; and FIG. 6 is a plan view showing a state of a defective alignment caused by one kind of spacers (hydrophilic spacers) in pixel portions of a liquid crystal display device in the related art.

DETAILED DESCRIPTION OF THE PREFERRED EMBODIMENTS

Figure 3A:
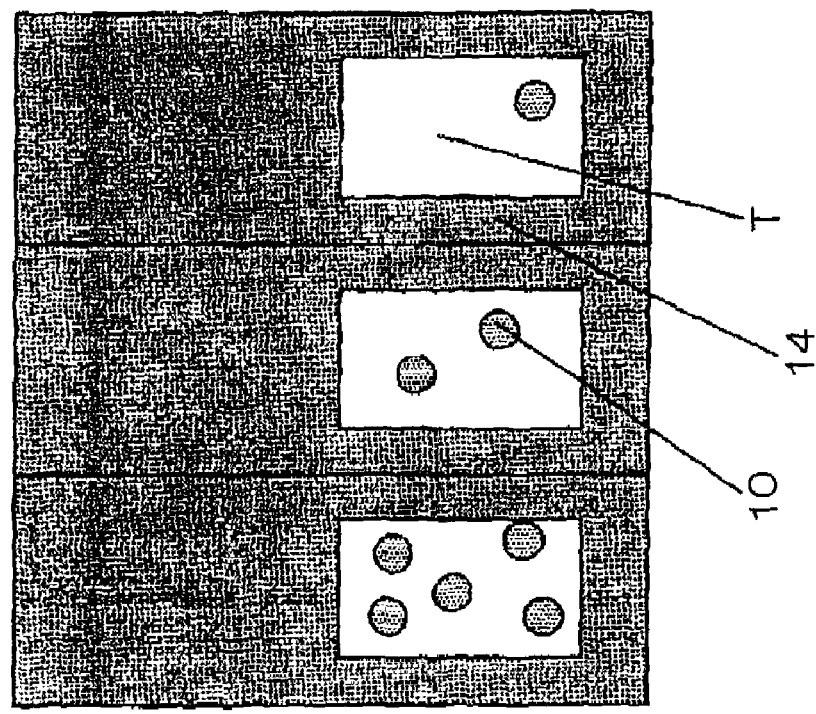
FIG. 3A is a plan view of pixel portions in the absence of localization of spacers.

FIG. 1 is a cross section schematically showing the structure of a liquid crystal display device of the invention. FIG. 2 is a plan view describing the structure of pixel regions on a bottom substrate. FIG. 3 is a schematic view describing spacers scattered in liquid crystal.

The liquid crystal display device comprises a liquid crystal display panel DP and a backlight BL.

The backlight BL is disposed on the outside of a transparent substrate 4b on the lower side of the liquid crystal display panel DP. Light therefrom passes through the liquid crystal layer by passing through light transmissive regions provided in the pixel regions, and reaches the display surface of the liquid crystal display panel DP.

The liquid crystal display panel DP chiefly comprises a glass substrate 4a, which is a transparent substrate on the upper side, a glass substrate 4b, which is a substrate on the lower side, and liquid crystal 16 interposed therebetween.

Transparent electrodes 5a made of ITO (indium tin oxide), SnO$_2$ (tin oxide) or the like, and an alignment film 6a made of polyimide resin or the like are deposited in this order on the inner main surface of the glass substrate 4a, which is the transparent substrate on the upper side.

A reflection film 9, a color filter 8, a smoothing film 7, transparent electrodes 5b, and an alignment film 6b are deposited in this order on the inner main surface of the glass substrate 4b, which is the transparent substrate on the lower side.

The transparent electrodes 5a on the top substrate 4a extend in a depth direction of the sheet surface of FIG. 1, and plural of them are formed in stripes to be parallel to each other. Also, regarding the transparent electrodes 5b on the bottom substrate 4b, plural of them are formed in stripes to be parallel to each other in a crosswise direction of the sheet surface of FIG. 1.

Hence, when viewed in a plane from the display surface side, the transparent electrodes 5a and the transparent electrodes 5b cross each other, and these crossing portions form "pixel regions". The pixel regions are arrayed laterally and longitudinally so as to form "a display region".

Because the liquid crystal display device of this embodiment is a color liquid crystal display device provided with the color filter 8, either one of three kinds of filters (red (R), green (G), and blue (B)) that together form the color filter 8 is deposited on a single pixel region.

In addition, the alignment film 6a to control the alignment of liquid crystal molecules of the liquid crystal 16 is formed on the transparent electrodes 5a, and the alignment film 6b to control the alignment of liquid crystal molecules of the liquid crystal 16 is also formed on the transparent electrode 5b. These alignment films 6a and 6b are made of, for example, polyimide resin, and after they are applied and cured they are subjected to rubbing treatment in a specific direction. An insulation film made of resin, SiO$_2$ or the like may be interposed between, respectively, the transparent electrodes 5a and 5b and the alignment films 6a and 6b.

Further, as has been described above, the reflection film 9 made of metal, the color filter 8, the smoothing film 7 made of acrylic resin to serve as an overcoat are formed between the inner main surface of the bottom substrate 4b and the transparent electrodes 5b.

The reflection film 9 has light transmission holes in the respective pixel regions where part of the reflection film 9 is removed. The light transmission holes are referred to as "light transmissive regions T". Also, regions in the respective pixel regions where the reflection film 9 is left serve as "light reflective regions R". It should be noted that the reflection film 9 is present also in boundary portions (hereinafter referred to as "inter-pixel regions") between adjacent pixel regions.

The color filter 8 is formed by applying photosensitive resist, prepared by dispersing a pigment (one of red, green, and blue) in a resin material, onto a specific region in the pixel region, followed by patterning by means of photolithography and curing.

A resin film containing a black pigment may be formed in the inter-pixel regions. The black resin film is formed in a matrix fashion or in stripes to surround the respective pixel regions.

Although it is not shown in the drawing, one size larger sealing portions than the display region are formed on the substrates 4a and 4b, and the substrate 4a and the substrate 4b are laminated to each other using these sealing portions, after which the liquid crystal 16 is sealed in a space therebetween.

The liquid crystal 16 is, for example, a twisted, chiral nematic liquid crystal material. When no electric field is applied between the transparent electrodes 5a and 5b under the alignment control by the alignment films 6a and 6b that come into contact with the liquid crystal 16, liquid crystal molecules are arrayed helically, for example, at an angle of 200° to 260°. When an electric field is applied between the transparent electrodes 5a and 5b, the helical array is brought into line. Light passing through the liquid crystal 16 is polarized with these two states.

Also, a number of spacers 10 are scattered inside the liquid crystal 16 to keep the thickness of the liquid crystal 16 constant. The spacers 10 are of an ellipsoidal shape in FIG. 1 for ease of illustration. However, they are actually of a spherical shape.

In addition, a first phase difference plate 3 and a second phase difference plate 2 made of polycarbonate or the like, and an iodine-based polarizing plate 1 are formed successively on the outer main surface of the surface substrate 4a. A phase difference plate 11 made of polycarbonate or the like and an iodine-based polarizing plate 12 are formed successively on the outer main surface of the back surface substrate 4b. These plates are bonded to each other via a bonding layer made of an acrylic material. A light-scattering film or the like may be provided in addition to these phase difference plates and polarizing plates.

The backlight BL comprises an optical waveguide 17 having a main surface of a size comparable to that of the display region, and a light source 18 disposed on the end face of the optical waveguide 17. These components are disposed on the back surface side of the liquid crystal display panel DP by means of a frame to establish specific positional relations with each other, so that the optical waveguide 17 corresponds to the display region of the liquid crystal panel DP.

In the liquid crystal display device of the structure as described above, when the pixel regions are concerned, as is shown in FIG. 2, a single pixel region includes the light reflective region R and the light transmissive region T. A light-shielding portion 20 comprising the black resin film is formed on the periphery of each pixel region. To cite an example of numerical values, one pixel is formed to be 240 μm×320 μm across the entire display region. The net outside dimensions a and b of the light reflective region R, excluding the width of the light-shielding portion 20 from a single pixel, are: a=70 μm and b=230 μm.

The reflection film 9 made of reflective metal is formed on the pixel region, and the reflection film 9 is made of AlNd or the like and has a thickness of about 1200 Å. Other available materials include Al, Al alloy (AlTi, etc.), Ag, Ag alloy (AgPd, AgPdCu, AgCuAu, etc.), and the thickness is set in a range from 1000 to 1500 Å.

The sizes c and d of the light transmissive region T formed in the reflection film 9 are, for example, c=50 μm and d=96.6

μm. Hence, a ratio of the area of the light reflective region R to the area of the light transmissive region T is R:T=70:30.

Because a single pixel region includes the light reflective region R and the light transmissive region T as described above, in a display state in the reflective mode using external light that comes incident on the display surface, a specific display is performed as light reaching the reflection film 9 from the display surface side via the liquid crystal 16 is reflected on the reflection film 9 and exits from the display surface side again via the liquid crystal 16. In a display state in the transmissive mode using light from the backlight BL, a specific display is performed as light from the backlight passes through the light transmissive region T and exits from the display surface side via the liquid crystal 16.

The structure of the spacers 10 scattered in the liquid crystal layer 16 to be provided without causing localization in the light reflective region or the light transmissive region of the pixel will now be described.

The spacers 10 include substantially transparent spacers, substantially black spacers, and semi-transparent spacers.

The base material of the transparent spacers is formed by subjecting a monomer having unsaturated ethylene groups to suspension polymerization using a radical polymerizing agent. Transparent spacers provided in the light transmissive regions referred to herein are those having light transmittance exceeding 80%.

The black spacers are obtained by mixing the monomer with a black pigment or covering the periphery of the transparent base material with a black coating film. Black spacers provided in the light transmissive regions referred to herein are those having light transmittance less than 20%.

The semi-transparent spacers 10 are formed by subjecting a monomer having unsaturated ethylene groups to suspension polymerization using a radical polymerizing agent. For the semi-transparent spacers provided in the light transmissive regions to have light transmittance of 20 to 80%, the monomer is mixed with a small quantity of black pigment or the periphery of the transparent base material is covered with a thin black coating film.

Figure 3B:
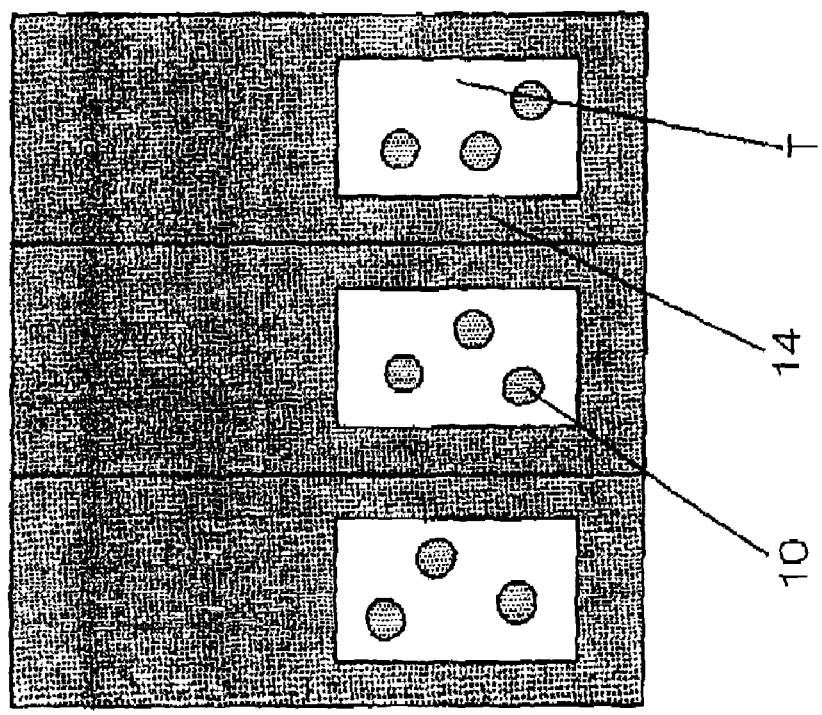
FIG. 3B is a plan view showing pixel portions in the presence of localization of spacers.

FIG. 3A and FIG. 3B are plan views showing spacers present in the light transmissive regions T.

FIG. 3A shows a state where the spacers are scattered evenly in the liquid crystal layer 16 and no display irregularities are present.

On the contrary, the spacers are scattered unevenly in the liquid crystal layer 16 of FIG. 3B, and a degree at which light passing through the light transmissive region T is shielded by the spacers varies from pixel to pixel, which appears as display irregularities.

In other words, irregularities are generated by a difference of the numbers of spacers in close pixels, in particular, spacers present in the light transmissive regions T.

Let r be a radius of spacers (a radius of a particle forming the base material of the spacer) and S be the area of the light transmissive region T within a single pixel.

Then, given N as the number of spacers present in the light transmissive region T, the area ratio of the spacers in the light transmissive region T is $N\pi r^2/S$.

Let NA and NB be the number of spacers present in two adjacent light transmissive regions TA and TB, respectively. Then, the area ratios of the spacers in the light transmissive regions TA and TB are $NA\pi r^2/S$ and $NB\pi r^2/S$, respectively. A difference is:

$$(NA-NB)\pi r^2/S \tag{1}$$

and irregularities become more noticeable as the value increases. Hence, the value becomes smaller and irregularities become less noticeable as a difference between NA and NB becomes smaller and as the areas S of the light transmissive regions are increased.

Another embodiment used in the invention will now be described with reference to FIG. 4.

In this embodiment, a spacer 10 comprises a black base material particle 20a and a hydrophilic group film 20b deposited on the surface of the black base material particle 20a.

More preferably, an alkyl group film 20c having up to 11 to 13 carbons is deposited on the surface of the hydrophilic group film 20b.

Figure 4:
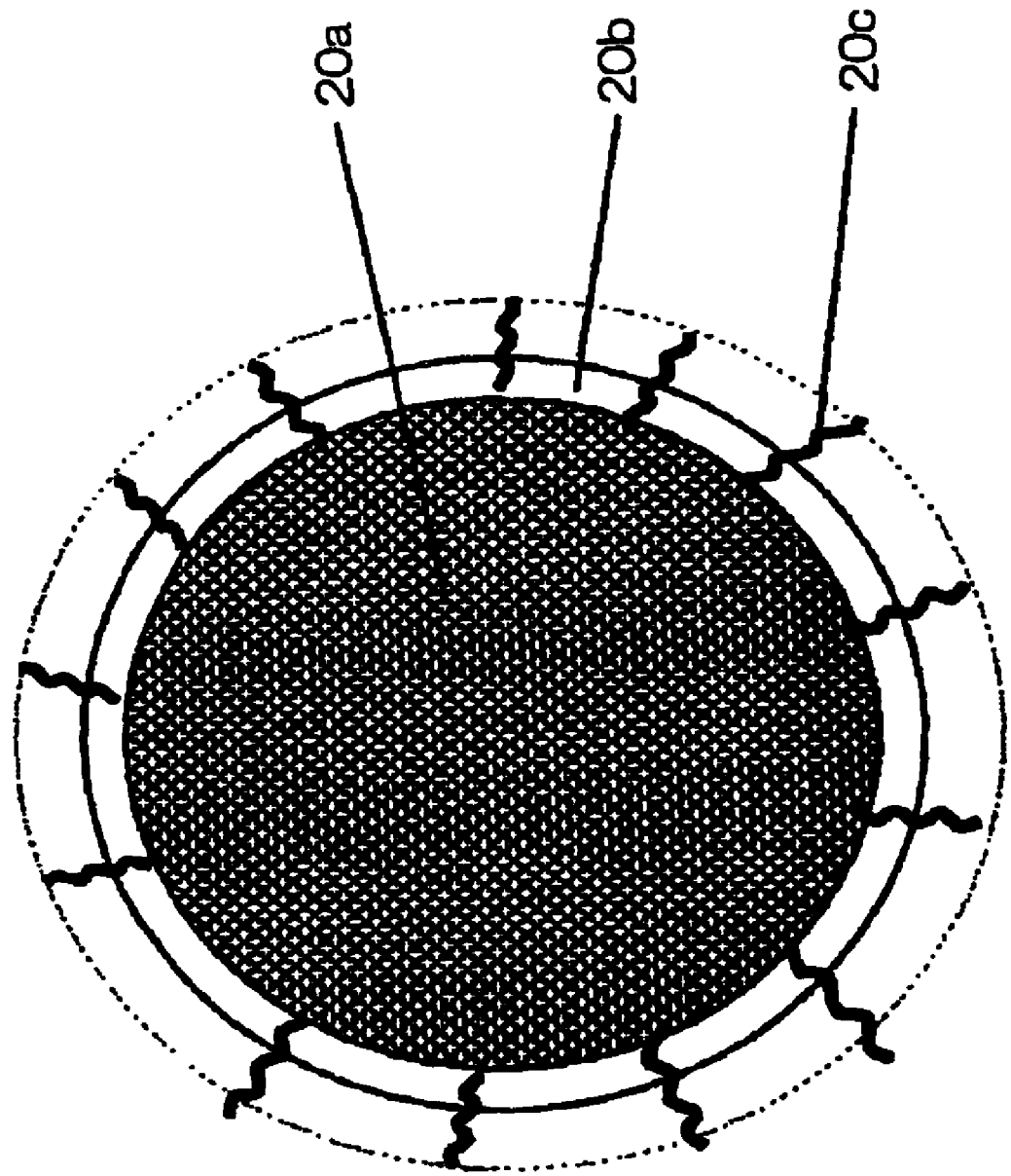
FIG. 4 is a view showing the structure of a spacer used in the invention.

Referring to FIG. 4, the alkyl group film 20c is illustrated schematically in the form of molecules. However, it is actually formed across the entire surface of the hydrophilic group film 20b, and the alkyl group film 20c is in the form of a film.

The black base material particle 20a used as the base material of the particle can be produced through two methods.

One is a method in which a transparent spacer, formed by subjecting a monomer having unsaturated ethylene groups to suspension polymerization using a radical polymerizing agent, is used as the base, and the surface thereof is covered with a black coating film, so that the black base material particle 20a is formed as a whole.

The other is a method in which the monomer is mixed with a black pigment, so that the base material itself is made in black.

A substitutional group film (referred to as hydrophilic group film) 20b having a hydrophilic property is formed on the surface of the black base material particle 20a produced in this manner, in a thickness of about 0.05 μm. The purpose is to prevent aggregation during wet scattering.

More preferably, the alkyl group film 20c is formed on the surface of the hydrophilic group film 20b. Because external light and light from the backlight on the periphery of the spacer 10 pass through regardless of whether the display is ON or OFF, the alkyl group film 20c eliminates passing of light by controlling the alignment control on the liquid crystal molecules of the liquid crystal 16.

The film thicknesses of the hydrophilic group film and the alkyl group film included in the radius of the spacer are negligibly small. Hence, the radius of the spacer can be actually the radius of the base material particle.

Still another embodiment will now be described with reference to FIG. 5 and FIG. 6.

In this embodiment, spacers 10 include hydrophilic spacers 10a and hydrophobic spacers 10b.

FIG. 5 is a plan view showing three adjacent pixel regions. Referring to FIG. 5, transparent or semi-transparent spacers 10 are provided in the pixel regions (regions enclosed by the black resin 20). The base material of the spacers 10 is formed by subjecting a monomer having unsaturated ethylene groups to suspension polymerization using a radical polymerizing agent.

Of these spacers 10, the spacers 10a having undergone hydrophilic treatment are spacers formed by applying polymerization treatment to polymerize alkyl group (having about 12 carbons) to the surface of the spacer base material.

The hydrophobic spacers 10b are spacers to which the alkyl group treatment as described above is not applied. In other words, the hydrophobic spacers 10b use the spacer base material simplexes (they show a hydrophobic property when the surface is not treated).

Firstly, in a case where only the spacers 10a to the surfaces of which is applied hydrophilic treatment are used as the spacers 10, for example, a linear alignment defect region 15 having spacers 10a as a nucleus may possibly occur between the spacers 10a and 10a as is shown in FIG. 6 due to an external force or stress, such as heat, in a portion where the spacers 10a are close to each other, because a strong restraining force to align the liquid crystal is exerted on the surface of each spacer 10a. Because light has no phase difference in this linear alignment defect region 15, it becomes a luminous spot in the black display.

Secondly, in a case only the hydrophobic spacers 10b are provided, the liquid crystal in the liquid crystal layer 3 tends to be arrayed depending on the outside shape of the hydrophobic spacers 10b in a portion where the hydrophobic spacers 10b are close to each other, because a restraining force induced from the alignment film 6 that aligns the liquid crystal molecules of the liquid crystal layer 3 is not exerted on the surface of each spacer 10b. Hence, the linear alignment defect region 15 having spacers as a nucleus as is shown in FIG. 6 does not occur between spacers due to an external force or stress, such as heat; however, leakage of light occurs from the periphery of the hydrophobic spacers 10b with an increase of the density of the hydrophobic spacers 10b.

Hence, in the invention, as will be described in Examples below, the spacer density of the hydrophobic spacers 10b is optimized by taking into account an alignment defect between spacers, leakage of light from the periphery of the spacers, uniformity of the panel GAP (thickness of the liquid crystal layer).

EXAMPLES

Example 1

A semi-transmissive liquid crystal display device having a light reflective region and a light transmissive region in one pixel and provided with transparent spacers at a density of 200 pieces/mm$^2$ was manufactured. Also, a semi-transmissive liquid crystal display device provided with black spacers at a density of 200 pieces/mm$^2$ was manufactured.

In addition, a semi-transmissive liquid crystal display device provided with semi-transparent spacers at a density of 200 pieces/mm$^2$ was manufactured.

More specifically, the radius r was set, for example, to 3 μm for each spacer.

TABLE 1 and TABLE 2 show evaluation results of roughness caused by white dropouts in the black display and roughness caused by black spots in the white display for the value of $\pi r^2/S$ when NA−NB=1 was given in Equation (1) above.

TABLE 1

| | | $\pi r^2/S$ | | | | | | | |
|---|---|---|---|---|---|---|---|---|---|
| | | 0.0010 | 0.0017 | 0.0023 | 0.0034 | 0.0047 | 0.0055 | 0.0067 | 0.0079 |
| TRANSPARENT SPACERS | ROUGHNESS IN WHITE DISPLAY | ○ | ○ | ○ | ○ | ○ | ○ | ○ | ○ |
| | ROUGHNESS IN BLACK DISPLAY | ○ | ○ | ○ | ○ | ○ | ○ | ○ | ○ |
| BLACK SPACERS | ROUGHNESS IN WHITE DISPLAY | ○ | ○ | ○ | ○ | ○ | ○ | ○ | ○ |
| | ROUGHNESS IN BLACK DISPLAY | ○ | ○ | ○ | ○ | ○ | ○ | ○ | ○ |
| | | $\pi r^2/S$ | | | | | | | |
| | | 0.0088 | 0.0101 | 0.0110 | 0.0117 | 0.0133 | 0.0150 | 0.0164 | 0.0207 |
| TRANSPARENT SPACERS | ROUGHNESS IN WHITE DISPLAY | ○ | ○ | ○ | ○ | ○ | ○ | ○ | ○ |
| | ROUGHNESS IN BLACK DISPLAY | ○ | ○ | △ | △ | △ | △ | △ | △ |
| BLACK SPACERS | ROUGHNESS IN WHITE DISPLAY | ○ | ○ | △ | △ | △ | △ | △ | △ |
| | ROUGHNESS IN BLACK DISPLAY | ○ | ○ | ○ | ○ | ○ | ○ | ○ | ○ |

※ SPACER DENSITY: 200 PIECES/mm$^2$

TABLE 2

| | | $\pi r^2/S$ | | | | | | | |
|---|---|---|---|---|---|---|---|---|---|
| | | 0.0010 | 0.0017 | 0.0023 | 0.0034 | 0.0047 | 0.0055 | 0.0067 | 0.0079 |
| SEMI-TRANSPARENT SPACERS (TRANSMITTANCE: 50%) | ROUGHNESS IN WHITE DISPLAY | ○ | ○ | ○ | ○ | ○ | ○ | ○ | ○ |
| | ROUGHNESS IN BLACK DISPLAY | ○ | ○ | ○ | ○ | ○ | ○ | ○ | ○ |
| | | $\pi r^2/S$ | | | | | | | |
| | | 0.0088 | 0.0101 | 0.0110 | 0.0117 | 0.0133 | 0.0150 | 0.0164 | 0.0207 |
| SEMI-TRANSPARENT SPACERS (TRANSMITTANCE: 50%) | ROUGHNESS IN WHITE DISPLAY | ○ | ○ | △ | △ | △ | △ | △ | △ |
| | ROUGHNESS IN BLACK DISPLAY | ○ | ○ | △ | △ | △ | △ | △ | △ |

※ SPACER DENSITY: 200 PIECES/mm$^2$

For example, the value of $\pi r^2/S$ in TABLE 1 and TABLE 2 was varied by adjusting the size of the pixel and the area of the light transmissive region as set forth below.

(1) when $\pi r^2/S$=0.0010: the dimension of one pixel excluding the width of the light-shielding portion 20 (actually, equivalent to the outside diameter dimension of the light reflective region R) was set to 110 μm×350 μm, and the dimension of the light transmissive region T in the reflection film 14 was set to 100 μm×269 μm, while the relation in terms of a ratio of the area of the light reflective region to the area of the light transmissive region in one pixel was set to 30:70.

(2) when $\pi r^2/S=0.0017$: the outside diameter dimension of the light reflective region R was set to 90 μm×290 μm, and the dimension of the light transmissive region T was set to 80 μm×212 μm, while the relation in terms of a ratio of the area of the light reflective region to the area of the light transmissive region was set to 35:65.

(3) when $\pi r^2/S=0.0023$: the outside diameter dimension of the light reflective region R was set to 70 μm×230 μm, and the dimension of the light transmissive region T was set to 60 μm×201 μm, while the relation in terms of a ratio of the area of the light reflective region to the area of the light transmissive region was set to 25:75.

(4) when $\pi r^2/S=0.0034$: the outside diameter dimension of the light reflective region R was set to 80 μm×260 μm, and the dimension of the light transmissive region T was set to 70 μm×119 μm, while the relation in terms of a ratio of the area of the light reflective region to the area of the light transmissive region was set to 60:40.

(5) when $\pi r^2/S=0.0047$: the outside diameter dimension of the light reflective region R was set to 60 μm×200 μm, and the dimension of the light transmissive region T was set to 50 μm×120 μm, while the relation in terms of a ratio of the area of the light reflective region to the area of the light transmissive region was set to 50:50.

(6) when $\pi r^2/S=0.0055$: the outside diameter dimension of the light reflective region R was set to 50 μm×170 μm, and the dimension of the light transmissive region T was set to 40 μm×128 am, while the relation in terms of a ratio of the area of the light reflective region to the area of the light transmissive region was set to 40:60.

(7) when $\pi r^2/S=0.0067$: the outside diameter dimension of the light reflective region R was set to 60 μm×200 μm, and the dimension of the light transmissive region T was set to 50 μm×84 μm, while the relation in terms of a ratio of the area of the light reflective region to the area of the light transmissive region was set to 65:35.

(8) when $\pi r^2/S=0.0079$: the outside diameter dimension of the light reflective region R was set to 60 μm×200 μm, and the dimension of the light transmissive region T was set to 50 μm×72 μm, while the relation in terms of a ratio of the area of the light reflective region to the area of the light transmissive region was set to 70:30.

(9) when $\pi r^2/S=0.0088$: the outside diameter dimension of the light reflective region R was set to 70 μm×230 μm, and the dimension of the light transmissive region T was set to 60 μm×54 μm, while the relation in terms of a ratio of the area of the light reflective region to the area of the light transmissive region was set to 80:20.

(10) when $\pi r^2/S=0.0101$: the outside diameter dimension of the light reflective region R was set to 50 μm×170 μm, and the dimension of the light transmissive region T was set to 40 μm×70 μm, while the relation in terms of a ratio of the area of the light reflective region to the area of the light transmissive region was set to 67:33.

(11) when $\pi r^2/S=0.0110$: the outside diameter dimension of the light reflective region R was set to 50 μm×170 I'm, and the dimension of the light transmissive region T was set to 40 μm×64 μm, while the relation in terms of a ratio of the area of the light reflective region to the area of the light transmissive region was set to 33:67.

(12) when $\pi r^2/S=0.0117$: the outside diameter dimension of the light reflective region R was set to 60 μm×200 μm, and the dimension of the light transmissive region T was set to 50 μm×48 μm, while the relation in terms of a ratio of the area of the light reflective region to the area of the light transmissive region was set to 80:20.

(13) when $\pi r^2/S=0.0133$: the outside diameter dimension of the light reflective region R was set to 50 μm×170 μm, and the dimension of the light transmissive region T was set to 40 μm×53 μm, while the relation in terms of a ratio of the area of the light reflective region to the area of the light transmissive region was set to 75:25.

(14) when $\pi r^2/S=0.0150$: the outside diameter dimension of the light reflective region R was set to 50 μm×170 μm, and the dimension of the light transmissive region T was set to 40 μm×47 μm, while the relation in terms of a ratio of the area of the light reflective region to the area of the light transmissive region was set to 78:22.

(15) when $\pi r^2/S=0.0164$: the outside diameter dimension of the light reflective region R was set to 50 μm×170 μm, and the dimension of the light transmissive region T was set to 40 μm×43 μm, while the relation in terms of a ratio of the area of the light reflective region to the area of the light transmissive region was set to 80:20.

(16) when $\pi r^2/S=0.0207$: the outside diameter dimension of the light reflective region R was set to 50 μm×170 μm, and the dimension of the light transmissive region T was set to 40 μm×34 μm, while the relation in terms of a ratio of the area of the light reflective region to the area of the light transmissive region was set to 84:16.

As is set forth in TABLE 1, with the transparent spacers, neither roughness nor display irregularities are observed at all in the white display and the black display when $\pi r^2/S$ is in a range from 0.001 to 0.01, whereas when $\pi r^2/S$ is larger than 0.01, although roughness is not observed in the white display, roughness and display irregularities are observed in the black display.

With the black spacers, when $\pi r^2/S$ is larger than 0.01, although roughness is not observed in the black display, roughness and display irregularities are observed in the white display.

Also, as is shown in TABLE 2, when $\pi r^2/S$ is in a range from 0.001 to 0.01, neither roughness nor display irregularities are observed at all in the white display and the black display, whereas when $\pi r^2/S$ is larger than 0.01, roughness is observed in both the white display and the black display.

The reason why roughness and display irregularities in the white display and roughness and display irregularities in the black display vary with the value of $\pi r^2/S$ in this manner is because when $\pi r^2/S$ is large, a single spacer has a large proportion to the light transmissive region and roughness caused by the spacers is visually recognized more easily, which appears as the display irregularities, whereas when $\pi r^2/S$ is small, a spacer has a small proportion to the light transmissive region and roughness is not visually recognized easily.

TABLE 3 compares the transparent spacers with the black spacers in terms of roughness in the white display, roughness in the black display, uniformity of the panel GAP (thickness of the liquid crystal layer 16) when the spacer density is varied.

Herein, a 3.8-inch diagonal semi-transmissive, STN liquid crystal display device was used. The outer diameter dimension of the light transmissive region R was 70 μm×230 μm, and the number of pixels was 240 RGB×320 dots. The dimension of the light transmissive region T was 50 μm×96.6 μm, and a ratio of the area of the light reflective region to the area of the light transmissive region was 70:30.

TABLE 3

| | | SPACER DENSITY (PIECES/mm²) | | | | | | | | | | | | | | | | | |
|---|---|---|---|---|---|---|---|---|---|---|---|---|---|---|---|---|---|---|---|
| | | 30 | 40 | 50 | 60 | 70 | 80 | 90 | 100 | 110 | 120 | 130 | 140 | 150 | 160 | 170 | 180 | 190 | 200 |
| TRANSPARENT SPACERS | ROUGHNESS IN WHITE DISPLAY | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | ROUGHNESS IN BLACK DISPLAY | ◎ | ◎ | ◎ | ◎ | ◎ | ◎ | ◎ | ◎ | ○ | ○ | ○ | ○ | △ | △ | X | X | X | X |
| | PANEL GAP UNIFORMITY | X | X | X | X | X | △ | △ | △ | △ | △ | △ | ○ | ○ | ○ | ○ | ◎ | ◎ | ◎ |
| BLACK SPACERS | ROUGHNESS IN WHITE DISPLAY | ◎ | ◎ | ◎ | ◎ | ◎ | ◎ | ◎ | ◎ | ○ | ○ | ○ | ○ | △ | △ | X | X | X | X |
| | ROUGHNESS IN BLACK DISPLAY | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | PANEL GAP UNIFORMITY | X | X | X | X | X | △ | △ | △ | △ | △ | △ | ○ | ○ | ○ | ○ | ◎ | ◎ | ◎ |

TABLE 3 reveals that for both the transparent spacers and the black spacers, the uniformity of the thickness of the liquid crystal layer 16 (panel GAP uniformity) is reduced when the scattering density of spacers is reduced.

For the transparent spacers, no roughness occurs in the white display on a whole range of the spacer density, whereas the occurrence of roughness in the black display is reduced as the spacer density is reduced.

For the black spacers, no roughness occurs in the black display on a whole range of the spacer density, whereas the occurrence of roughness in the white display is reduced as the spacer density is reduced.

TABLE 4 compares roughness in the white display, roughness in the black display, and uniformity of the thickness of the liquid crystal layer 16 (panel GAP uniformity) when a mixing ratio of the black spacers and the transparent spacers was varied in the structure in which the black spacers and the transparent spacers were mixed.

In order to keep the panel GAP uniformity, the spacer density was kept to be constant at 200 pieces/mm². The size of the light transmissive region T in the reflection film was 50 μm×96.6 μm, and a ratio of the area of the light reflective region to the area of the light transmissive region was 70:30.

When a ratio of the black spacers to the transparent spacers is in a range from 20:80 to 80:20, roughness in the white display and roughness in the black display both tend to improve (a region marked with △ or better in TABLE 4). A ratio of the black spacers to the transparent spacers is preferably in a range from 30:70 to 70:30 (a range marked with ○ or better in TABLE 4), and roughness is improved most satisfactorily when a ratio of the black spacers to the transparent spacers is 50:50 (a range marked with ◎ in TABLE 4).

In view of the foregoing, in a semi-transmissive liquid crystal display device having a light reflective region and a light transmissive region within a single pixel and performing a liquid crystal display using ambient external light and light from the backlight, by providing the black spacers and the transparent spacers at a mixing ratio in the range from 20%:80% to 80%:20% in a space between two transparent substrates at the top and bottom, it is possible to provide a liquid crystal display device capable of maintaining uniformity of the GAP (interval) between the two substrates and having no display irregularities, such as roughness, in both the black display and the white display.

TABLE 4

| | | | | | | | | | | | |
|---|---|---|---|---|---|---|---|---|---|---|---|
| TRANSPARENT SPACERS | 0% | 10% | 20% | 30% | 40% | 50% | 60% | 70% | 80% | 90% | 100% |
| BLACK SPACERS | 100% | 90% | 80% | 70% | 60% | 50% | 40% | 30% | 20% | 10% | 0% |
| ROUGHNESS IN WHITE DISPLAY | X | X | △ | ○ | ○ | ◎ | ◎ | ◎ | ◎ | ◎ | ◎ |
| ROUGHNESS IN BLACK DISPLAY | ◎ | ◎ | ◎ | ◎ | ◎ | ◎ | ○ | ○ | △ | X | X |
| PANEL GAP UNIFORMITY | ◎ | ◎ | ◎ | ◎ | ◎ | ◎ | ◎ | ◎ | ◎ | ◎ | ◎ |

※ 200 PIECES/mm²

TABLE 4 reveals that when a ratio of the number of the transparent spacers to the number of the black spacers is in a range from 0:100 to 10:90, although no roughness is observed in the black display, roughness in the white display is deteriorated.

In addition, when a ratio of the transparent spacers to the black spacers is in a range from 90:10 to 100:0, although no roughness is observed in the white display, roughness in the black display is deteriorated.

TABLE 5 compares roughness in the white display, roughness in the black display, uniformity of the thickness of the liquid crystal layer (panel GAP uniformity) with respect to light transmittance of semi-transparent spacers.

In order to keep the panel GAP uniformity, the spacer density was set to be constant at 200 pieces/mm². The size of the light transmissive region T in the reflection film was 50 μm×96.6 μm, and a ratio of the area of the light reflective region to the area of the light transmissive region was 70:30.

TABLE 5

| | TRANSMITTANCE OF SEMI-TRANSPARENT SPACERS | | | | | | | | | | |
|---|---|---|---|---|---|---|---|---|---|---|---|
| | 0% | 10% | 20% | 30% | 40% | 50% | 60% | 70% | 80% | 90% | 100% |
| ROUGHNESS IN WHITE DISPLAY | X | X | Δ | ○ | ○ | ◎ | ◎ | ◎ | ◎ | ◎ | ◎ |
| ROUGHNESS IN BLACK DISPLAY | ◎ | ◎ | ◎ | ◎ | ◎ | ◎ | ○ | ○ | Δ | X | X |
| PANEL GAP UNIFORMITY | ◎ | ◎ | ◎ | ◎ | ◎ | ◎ | ◎ | ◎ | ◎ | ◎ | ◎ |

TABLE 5 reveals that when transmittance of the semi-transparent spacers is in a range from 0% to 10%, although no roughness is observed in the black display, roughness in the white display is deteriorated.

Also, when transmittance of the semi-transparent spacers is in a range from 90% to 100%, although no roughness is observed in the white display, roughness in the black display is deteriorated.

When transmittance of the semi-transparent spacers is in a range from 20% to 80%, roughness in the white display and roughness in the black display both tend to improve (a range marked with Δ or better in TABLE 5). Preferably, transmittance of the semi-transparent spacers is in a range from 30% to 70% (a range marked with ○ or better in TABLE 5), and roughness is improved most satisfactorily when transmittance is 50% (a range marked with ◎ in TABLE 5).

Example 2

Visual recognition and an alignment defect of liquid crystal caused by pressing were checked in a liquid crystal display device using the spacers shown in FIG. 4.

The black base material particle 20a and a transparent base material particle as a comparative example were prepared as base material particles of the spacers. Further, for the base material particles of each type, those with and without the hydrophilic group film 20b were prepared.

Further, those with and without the alkyl group film 20c were prepared. Furthermore, for those having the alkyl group film 20c, the thickness (maximum number of carbons) of the alkyl groups was varied in various manners.

TABLE 6 shows the result when roughness caused by white dropouts in the black display, roughness caused by black spots in the white display, and an alignment defect of liquid crystal caused by pressing were checked in the liquid crystal device using the spacers.

TABLE 6

| SPACER BASE MATERIAL | TRANSPARENT | | | | | |
|---|---|---|---|---|---|---|
| MAXIMUM NUMBER OF CARBONS OF ALKYL GROUP | NAUGHT | NAUGHT | 8 | 10 | 12 | 14 |
| HYDROPHILIC GROUP | WITHOUT | WITH | WITH | WITH | WITH | WITH |
| WHITE DROPOUTS IN BLACK DISPLAY | X X | X | X | Δ | Δ | Δ |
| BLACK SPOTS IN WHITE DISPLAY | ◎ | ◎ | ◎ | ◎ | ◎ | ◎ |
| ALIGNMENT DEFECT CAUSED BY PRESSING | ○ | ○ | X | ○ | ○ | ○ |

| SPACER BASE MATERIAL | BLACK | | | | | | | |
|---|---|---|---|---|---|---|---|---|
| MAXIMUM NUMBER OF CARBONS OF ALKYL GROUP | NAUGHT | NAUGHT | 8 | 10 | 11 | 12 | 13 | 14 |
| HYDROPHILIC GROUP | WITHOUT | WITH | WITH | WITH | WITH | WITH | WITH | WITH |
| WHITE DROPOUTS IN BLACK DISPLAY | Δ | ○ | ◎ | ◎ | ◎ | ◎ | ◎ | ◎ |
| BLACK SPOTS IN WHITE DISPLAY | ○ | ○ | ○ | ○ | ○ | ○ | ○ | X |
| ALIGNMENT DEFECT CAUSED BY PRESSING | ○ | ○ | X | X | ○ | ○ | ○ | ○ |

In view of the foregoing, in a semi-transmissive liquid crystal display device having a light reflective region and a light transmissive region within a single pixel and performing a liquid crystal display using ambient external light and light from the backlight, by providing semi-transparent spacers having transmittance in a range from 20% to 80% in a space between two transparent substrates at the top and bottom, it is possible to obtain a liquid crystal display device capable of maintaining the uniformity of the GAP (interval) between two substrates 4 and 4 and having no display irregularities, such as roughness, in both the black display and the white display.

TABLE 6 reveals that when the base material particle is the transparent base material, it is quite difficult to eliminate white dropouts in the black display by increasing the maximum number of carbons of the alkyl group.

Meanwhile, when the base material of the spacers is the black base material particle 20a, white dropouts in the black display are not satisfactory in the complete absence of the substitutional group film 20b having a hydrophilic property and the alkyl group film 20c.

When the base material of the spacers is the black base material particle 20a, white dropouts in the black display are satisfactory in the presence of the substitutional group film 20b having a hydrophilic property. Further, white dropouts in the black display are extremely satisfactory in the presence of the alkyl group film 20c.

Also, in a case where the substitutional group film 20b having a hydrophilic property as well as the alkyl group film 20c are formed on the surface of the black base material particle 20a, when an alignment restraining force on liquid crystal molecules of the liquid crystal 16 is increased by increasing the maximum number of carbons to 14 or more, the spacer aligns the liquid crystal molecules in a broad range on the periphery of the spacer in the white display, which conversely gives rise to black spots that appear noticeably as irregularities in the white display, and the liquid crystal display device goes into a useless state (marked with x in TABLE 6).

In a case where the substitutional group film 20b having a hydrophilic property as well as the alkyl group film 20c are formed on the surface of the black base material particle 20a, when the maximum number of carbons of the alkyl group film 20c is 10 or less, an alignment restraining force on liquid crystal molecules becomes so weak that an alignment defect occurs when an external force is applied to the liquid crystal display device, and the liquid crystal display goes into a useless state (marked with x in TABLE 6).

In a case where the alkyl group film itself is not formed, because the hydrophilic group also has an alignment restraining force on the liquid crystal molecules, white dropouts in the black display are more likely to occur (marked with Δ in TABLE 6).

As has been described, TABLE 6 reveals a tendency that overall visual recognition is increased either in the black display or in the white display when the liquid crystal panel DP performing the display in the reflective mode and the display in the transmissive mode is activated, by using the black base material particle 20a than by using the transparent base material particles. It is thus possible to provide a liquid crystal display device extremely suitable for a practical use.

The film thickness of the hydrophilic group film 20b formed on the surface of the black base material particle 20a will now be described.

The spacers 10 are scattered, for example, by means of wet scattering on one of the glass substrates chiefly in fabrication sequence. It is important that the spacers 10 are scattered uniformly in the display region as a result of scattering. In order to improve visual recognition of the liquid crystal display, aggregation of the spacers 10 should be avoided.

TABLE 7 shows the evaluation result of a scattering property at the time of wet scattering by varying the film thickness of the hydrophilic group film 20b of the spacer 10.

A scattering solution was manufactured by mixing 500 g of IPA (isopropyl alcohol) and 500 g of pure water with 10 g of spacers provided with the hydrophilic group film 20b having a specific film thickness. The spacers 10 were scattered by spraying the scattering solution to the substrate from 1.5 to 2.0 m above, and evaluation was made as to the occurrence of aggregation and the like.

In a case where the hydrophilic group film was formed on the surface of the spacer in film thicknesses up to 0.01 μm and in a range from 0.07 to 0.15 μm, as is revealed in TABLE 7, aggregation occurred as a result of wet scattering.

On the contrary, when the film thickness of the hydrophilic group film 20b on the surface of the spacer 10 was set to 0.02 to 0.06 μm, no aggregation occurred as a result of wet scattering, and the scattering property was satisfactory.

As has been described, a hydrophilic property varies with the thickness of the hydrophilic group film 20b. When the hydrophilic property is too small, the spacers 10 are not scattered uniformly in pure water containing alcohol, which gives rise to aggregation. When the hydrophilic property is too large, the spacers 10 move too freely in pure water containing alcohol, and aggregation is thought to occur because the spacers 10 try to assemble in the solution. Either case is marked with x in TABLE 7.

The shape of the spacer 10, more specifically, the area when viewed in a plane, an adequate range of the light transmissive region T, and the relation with the alkyl group film, were checked.

As with the other examples, the radius of the spacer, r, was set to r=3 μm. Also, S is given as the dimension of the light transmissive region T.

TABLE 8 shows the evaluation result of white dropouts in the black display, black spots in the white display, an alignment defect caused by pressing by varying the value of $\pi r^2/S$ when NA−NB=1 (0 is ideal) was given in Equation (1) above and the film thickness (length of alkyl groups) of the alkyl group film formed on the outermost surface of the spacer. All the spacers used herein were the spacers made of the black base material particles.

TABLE 7

| FILM THICKNESS OF HYDROPHILIC GROUP | 0.01 μm | 0.02 μm | 0.03 μm | 0.04 μm | 0.05 μm | 0.06 μm | 0.07 μm | 0.08 μm | 0.09 μm | 0.10 μm | 0.15 μm |
|---|---|---|---|---|---|---|---|---|---|---|---|
| SCATTERING PROPERTY AT WET SCATTERING | X | ○ | ○ | ○ | ○ | ○ | X | X | X | X | X |

TABLE 8

| MAXIMUM NUMBER OF CARBONS OF ALKYL GROUP | HYDRO-PHILIC GROUP | PARTICULARS | $\pi r^2/S$ | | | | | | | |
|---|---|---|---|---|---|---|---|---|---|---|
| | | | 0.0010 | 0.0017 | 0.0023 | 0.0034 | 0.0047 | 0.0055 | 0.0067 | 0.0079 |
| NAUGHT | WITHOUT | WHITE DROPOUTS IN BLACK DISPLAY | Δ | Δ | Δ | Δ | Δ | Δ | Δ | Δ |
| | | BLACK SPOTS IN WHITE DISPLAY | ○ | ○ | ○ | ○ | ○ | ○ | ○ | ○ |
| | | ALIGNMENT DEFECT CAUSED BY PRESSING | ○ | ○ | ○ | ○ | ○ | ○ | ○ | ○ |
| NAUGHT | WITH | WHITE DROPOUTS IN BLACK DISPLAY | ○ | ○ | ○ | ○ | ○ | ○ | ○ | ○ |
| | | BLACK SPOTS IN WHITE DISPLAY | ○ | ○ | ○ | ○ | ○ | ○ | ○ | ○ |
| | | ALIGNMENT DEFECT CAUSED BY PRESSING | ○ | ○ | ○ | ○ | ○ | ○ | ○ | ○ |
| 1 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ○ | ○ | ○ | ○ | ○ | ○ | ○ | ○ |
| | | ALIGNMENT DEFECT CAUSED BY PRESSING | X | X | X | X | X | X | X | X |
| 2 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ○ | ○ | ○ | ○ | ○ | ○ | ○ | ○ |
| | | ALIGNMENT DEFECT CAUSED BY PRESSING | X | X | X | X | X | X | X | X |
| 8 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ○ | ○ | ○ | ○ | ○ | ○ | ○ | ○ |
| | | ALIGNMENT DEFECT CAUSED BY PRESSING | X | X | X | X | X | X | X | X |
| 9 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ○ | ○ | ○ | ○ | ○ | ○ | ○ | ○ |
| | | ALIGNMENT DEFECT CAUSED BY PRESSING | X | X | X | X | X | X | X | X |
| 10 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ○ | ○ | ○ | ○ | ○ | ○ | ○ | ○ |
| | | ALIGNMENT DEFECT CAUSED BY PRESSING | X | X | X | X | X | X | X | X |
| 11 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ○ | ○ | ○ | ○ | ○ | ○ | ○ | ○ |
| | | ALIGNMENT DEFECT CAUSED BY PRESSING | ○ | ○ | ○ | ○ | ○ | ○ | ○ | ○ |
| 12 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ○ | ○ | ○ | ○ | ○ | ○ | ○ | ○ |
| | | ALIGNMENT DEFECT CAUSED BY PRESSING | ○ | ○ | ○ | ○ | ○ | ○ | ○ | ○ |
| 13 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ○ | ○ | ○ | ○ | ○ | ○ | ○ | ○ |
| | | ALIGNMENT DEFECT CAUSED BY PRESSING | ○ | ○ | ○ | ○ | ○ | ○ | ○ | ○ |
| 14 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | Δ | Δ | Δ | Δ | Δ | Δ | Δ | X |
| | | ALIGNMENT DEFECT CAUSED BY PRESSING | ○ | ○ | ○ | ○ | ○ | ○ | ○ | ○ |
| 15 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | Δ | Δ | Δ | Δ | X | X | X | X |
| | | ALIGNMENT DEFECT CAUSED BY PRESSING | ○ | ○ | ○ | ○ | ○ | ○ | ○ | ○ |

TABLE 8-continued

| MAXIMUM NUMBER OF CARBONS OF ALKYL GROUP | HYDRO- PHILIC GROUP | PARTICULARS | $\pi r^2/S$ | | | | | | | |
|---|---|---|---|---|---|---|---|---|---|---|
| | | | 0.0088 | 0.0101 | 0.0110 | 0.0117 | 0.0133 | 0.0150 | 0.0164 | 0.0207 |
| NAUGHT | WITH- OUT | WHITE DROPOUTS IN BLACK DISPLAY | Δ | Δ | Δ | Δ | Δ | Δ | Δ | Δ |
| | | BLACK SPOTS IN WHITE DISPLAY | ◯ | ◯ | ◯ | ◯ | ◯ | ◯ | ◯ | ◯ |
| | | ALIGNMENT DEFECT CAUSED BY PRESSING | ◯ | ◯ | ◯ | ◯ | ◯ | ◯ | ◯ | ◯ |
| NAUGHT | WITH | WHITE DROPOUTS IN BLACK DISPLAY | ◯ | ◯ | ◯ | ◯ | ◯ | ◯ | ◯ | ◯ |
| | | BLACK SPOTS IN WHITE DISPLAY | ◯ | ◯ | Δ | Δ | Δ | Δ | Δ | Δ |
| | | ALIGNMENT DEFECT CAUSED BY PRESSING | ◯ | ◯ | ◯ | ◯ | ◯ | ◯ | ◯ | ◯ |
| 1 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ◯ | ◯ | ◯ | ◯ | ◯ | ◯ | ◯ | ◯ |
| | | ALIGNMENT DEFECT CAUSED BY PRESSING | X | X | X | X | X | X | X | X |
| 2 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ◯ | ◯ | ◯ | ◯ | ◯ | ◯ | ◯ | ◯ |
| | | ALIGNMENT DEFECT CAUSED BY PRESSING | X | X | X | X | X | X | X | X |
| 8 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ◯ | ◯ | ◯ | ◯ | ◯ | ◯ | ◯ | ◯ |
| | | ALIGNMENT DEFECT CAUSED BY PRESSING | X | X | X | X | X | X | X | X |
| 9 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ◯ | ◯ | ◯ | ◯ | ◯ | ◯ | ◯ | Δ |
| | | ALIGNMENT DEFECT CAUSED BY PRESSING | X | X | X | X | X | X | X | X |
| 10 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ◯ | ◯ | ◯ | ◯ | ◯ | ◯ | Δ | Δ |
| | | ALIGNMENT DEFECT CAUSED BY PRESSING | X | X | X | X | X | X | X | X |
| 11 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ◯ | ◯ | ◯ | ◯ | Δ | Δ | Δ | Δ |
| | | ALIGNMENT DEFECT CAUSED BY PRESSING | ◯ | ◯ | ◯ | ◯ | ◯ | ◯ | ◯ | ◯ |
| 12 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ◯ | ◯ | ◯ | Δ | Δ | Δ | Δ | Δ |
| | | ALIGNMENT DEFECT CAUSED BY PRESSING | ◯ | ◯ | ◯ | ◯ | ◯ | ◯ | ◯ | ◯ |
| 13 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | ◯ | ◯ | Δ | Δ | Δ | Δ | Δ | Δ |
| | | ALIGNMENT DEFECT CAUSED BY PRESSING | ◯ | ◯ | ◯ | ◯ | ◯ | ◯ | ◯ | ◯ |
| 14 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | X | X | X | X | X | X | X | X |
| | | ALIGNMENT DEFECT CAUSED BY PRESSING | ◯ | ◯ | ◯ | ◯ | ◯ | ◯ | ◯ | ◯ |
| 15 | WITH | WHITE DROPOUTS IN BLACK DISPLAY | ◎ | ◎ | ◎ | ◎ | ◎ | ◎ | ◎ | ◎ |
| | | BLACK SPOTS IN WHITE DISPLAY | X | X | X | X | X | X | X | X |
| | | ALIGNMENT DEFECT CAUSED BY PRESSING | ◯ | ◯ | ◯ | ◯ | ◯ | ◯ | ◯ | ◯ |

Referring to TABLE 8, the value of $\pi r^2/S$ is varied from 0.0010 to 0.0207, and because the contents are the same as those described with reference to TABLE 1 and TABLE 2 above, the descriptions are not repeated herein.

TABLE 8 reveals that let r be a radius of the black base material particle, and S be the dimension of the light transmissive region T on the pixel region, then it is preferable to set the value of $\pi r^2/S$ to 0.001 to 0.01 when the spacer comprises the black base material particle 20a and the hydrophilic group film 20b deposited on the surface of the particle.

In addition, when the alkyl group film 20c is provided on the surface of the hydrophilic group film 20b, it is particularly important to set the maximum number of carbons to 11 to 13.

On the whole range where $\pi r^2/S = 0.01$ or less, white dropouts in the black display are satisfactory; moreover, display of black spots in the white display is markedly improved.

In a case where the maximum number of carbons of the alkyl group is 15, a few black spots are observed in the white display when $\pi r^2/S$ is in a range from 0.001 to 0.034.

In a case where the maximum number of carbons of the alkyl group is 14, a few black spots are observed in the white display when $\pi r^2/S$ is in a range from 0.001 to 0.0067.

In a case where the maximum number of carbons of the alkyl group is 13, no black spots are observed in the white display when $\pi r^2/S$ is in a range from 0.001 to 0.0101.

In a case where the maximum number of carbons of the alkyl group is 12, no black spots are observed in the white display when $\pi r^2/S$ is in a range from 0.001 to 0.0110.

In a case where the maximum number of carbons of the alkyl group is 11, no black spots are observed in the white display when $\pi r^2/S$ is in a range from 0.001 to 0.0117.

In a case where the maximum number of carbons of the alkyl group is in a range from 1 to 10, an alignment defect caused by pressing is observed on a whole range of $\pi r^2/S$.

As has been described, the maximum number of carbons of the alkyl group is preferably in a range from 11 to 13 in preventing the occurrence of black spots in the white display in accordance with the value of $\pi r^2/S$.

The reason why is because, in the white display, liquid crystal molecules are in a state where they stand perpendicularly with respect to the top and bottom substrates, whereas liquid crystal molecules of the liquid crystal 16 on the periphery of the spacer are horizontal with respect to the top and bottom substrates 4a and 4b, which causes the periphery of the spacer to appear in black.

The length of the alkyl chain formed on the periphery of the spacer becomes longer as the maximum number of carbons of the alkyl group formed on the periphery of the spacer is increased, and an alignment restraining force to align the liquid crystal 16 perpendicularly to the spacer becomes stronger.

For example, when the maximum number of carbons of the alkyl group is set to 14 or larger, liquid crystal molecules of the liquid crystal 16 on a broader periphery of the spacer are aligned perpendicularly, which blackens a broader periphery of the spacer.

In addition, when $\pi r^2/S$ is small, because the spacer has a small proportion to the light transmissive region T, even when a black region on the periphery of the spacer becomes larger, the influence is little.

On the contrary, when a dimension ratio of the light transmissive region T is small, because the spacer has a large proportion to the light transmissive region, when a black region on the periphery of the spacer becomes larger, it is visually recognized with ease.

Hence, even when the maximum number of carbons of the alkyl group is increased, black spots in the white display occur less readily as the dimension of the light transmissive region T is smaller. When the area of the light transmissive region is increased, black spots occur in the white display where the maximum number of carbons of the alkyl group is small.

When the maximum number of carbons of the alkyl group forming the alkyl group film 20c is set to 10 or smaller, an alignment defect caused by pressing occurs in the liquid crystal display device on a whole range of $\pi r^2/S$ because an alignment restraining force on liquid crystal molecules of the liquid crystal 16 is weak.

Further, in a case where an alkyl group per se is not formed, white dropouts in the black display can be eliminated and no alignment defect occurs when an external force is applied on a whole range of $\pi r^2/S$, because a hydrophilic group also has an alignment restraining force on liquid crystal molecules.

In view of the foregoing, as conditions to satisfy all the evaluations on white dropouts in the black display, black spots in the white display, and an alignment defect caused by pressing in a liquid crystal display device in which the reflection film 9 provided with light transmissive regions is formed on the substrate 4b on the lower side, by providing spacers, formed by forming the hydrophilic group film 20b and the alkyl group film 20c having alkyl groups up to 11 to 13 carbons on the surface of the black base-material particle 20a, in the liquid crystal 16 while setting $\pi r^2/S$ to a range from 0.001 to 0.01 both inclusive, or by providing spacers having the hydrophilic groups alone on the black base material particle, it is possible to provide a liquid crystal display device having no display irregularities.

Example 3

TABLE 9 shows the result when the spacer density of the hydrophobic spacers 10b, an alignment defect between spacers, leakage of light from the periphery of spacers, uniformity of the panel GAP (thickness of the liquid crystal layer) were checked.

TABLE 9

| | HYDROPHOBIC TREATMENT SPACER DENSITY (PIECES/mm²) | | | | | | | | | |
|---|---|---|---|---|---|---|---|---|---|---|
| | 20 | 40 | 60 | 80 | 100 | 120 | 140 | 160 | 180 | 200 |
| ALIGNMENT DEFECT BETWEEN SPACERS | ◎ | ◎ | ◎ | ◎ | ◎ | ◎ | ◎ | ◎ | ◎ | ◎ |
| LEAKAGE OF LIGHT FROM PERIPHERY OF SPACER | ◎ | ◎ | ◎ | ◎ | ◎ | ○ | ○ | ○ | Δ | X |
| PANEL GAP UNIFORMITY | X | X | X | Δ | Δ | Δ | Δ | ○ | ○ | ◎ |

An alignment defect between the hydrophobic spacers 10b is satisfactory when the hydrophobic spacer density is in a range from 20 to 200 pieces/mm². This is because no alignment restraining force on liquid crystal molecules is exerted on the spacer surface, and no alignment defect occurs between the spacers where spacers are close to each other.

Leakage of light from the periphery of spacers is satisfactory when the hydrophobic spacer density is in a range from 20 to 100 pieces/mm²; however, it deteriorates as the density of the hydrophobic spacers 10b increases.

The is because liquid crystal molecules are aligned horizontally along the surface of the hydrophobic spacers 10b and leakage of light occurs on the peripheral portion of all the hydrophobic spacers 10b. When a scattering density of the hydrophobic spacers 10b in the liquid crystal layer 3 is increased, a light leaking portion, when viewed from the display surface side, becomes noticeable.

The panel GAP uniformity (uniformity of the layer thickness of the liquid crystal layer 3 in the pixel region) is satisfactory when the density of the hydrophobic spacers 10b is at 200 pieces/mm²; however, it deteriorates as the hydrophobic spacer density is reduced. For example, at lower than 80 pieces/mm², it is far below a display level for a practical use (marked with x in the table), in a range from 80 pieces/mm² inclusive to 160 pieces/mm² exclusive, it is below a display level for a practical use (marked with Δ in the table), in a range from 160 pieces/mm² inclusive to 200/mm² exclusive, it reaches a display level for a practical use (marked with ○ in the table), and at 200 pieces/mm² or above, it reaches a satisfactory display level because the uniformity of the thickness of the liquid crystal layer can be achieved in a stable manner (marked with ◎ in the table). This is because spacer 3 functions as a pillar that supports the two transparent substrates 4 and 4.

A spacer density, an alignment defect between spacers, leakage of light from the periphery of spacers, and the panel GAP uniformity were checked in a case where the hydrophilic spacers 10a alone were used. The result is set forth in TABLE 10.

pieces/mm² exclusive (marked with ◎ in the table), and it deteriorates as a distribution density of the hydrophilic spacers 10a is increased. For example, in a range from 120 pieces/mm² inclusive to 180 pieces/mm² exclusive, it reaches a display level for a practical use (marked with ○ in the table), and at 180 pieces/mm² or above, it is below a display level for a practical use (marked with Δ in the table)

The reason why is because a strong alignment restraining force on liquid crystal molecules is exerted on the surface of the spacer a, an alignment defect occurs between the hydrophilic spacers 10a in a portion where the spacers 10a are close to each other. The frequency of such occurrences increases as the density of the hydrophilic spacers 10a increases.

Leakage of light from the periphery of spacers is satisfactory when a hydrophilic spacer density is in a range from 20 to 200 pieces/mm².

This is because an alignment restraining force on liquid crystal molecules is exerted on the surface of the hydrophilic spacer 10a, leakage of light does not occur on the periphery of all the hydrophilic spacers.

As with the hydrophobic spacers 10b, the panel GAP uniformity (uniformity of the layer thickness of the liquid crystal layer in the pixel region) is satisfactory when a density of spacers is at 200 pieces/mm²; however, it deteriorates as a density of the hydrophilic spacers 10a is reduced.

Hence, an overall density of the hydrophilic spacers 10a and the hydrophobic spacers 10b was set to 200 pieces/mm² by taking into account the uniformity of the layer thickness of the liquid crystal layer, and the hydrophilic spacers 10a and the hydrophobic spacers 10b were mixed in order to eliminate leakage of light from the periphery of spacers, which is a problem of the hydrophobic spacers 10b, and an alignment defect 15 between spacers, which is a problem of the hydrophilic spacers 10a.

An alignment defect 15 between spacers, leakage of light from the periphery of spacers, and a panel GAP uniformity were checked at specific mixing ratios.

TABLE 10

| | HYDROPHILIC TREATMENT SPACER DENSITY (PIECES/mm²) | | | | | | | | | |
|---|---|---|---|---|---|---|---|---|---|---|
| | 20 | 40 | 60 | 80 | 100 | 120 | 140 | 160 | 180 | 200 |
| ALIGNMENT DEFECT BETWEEN SPACERS | ◎ | ◎ | ◎ | ◎ | ◎ | ○ | ○ | ○ | Δ | Δ |
| LEAKAGE OF LIGHT FROM PERIPHERY OF SPACER | ◎ | ◎ | ◎ | ◎ | ◎ | ◎ | ◎ | ◎ | ◎ | ◎ |
| PANEL GAP UNIFORMITY | X | X | X | Δ | Δ | Δ | Δ | ○ | ○ | ◎ |

An alignment defect between spacers achieves a satisfactory display level when the spacer density of the hydrophilic spacers 10a is in a range from 20 pieces/mm² inclusive to 120

The result is set forth in TABLE 11. A density of the spacers 10a and 10b was set to 200 pieces/mm². The purpose was to stabilize the panel GAP uniformity.

TABLE 11

| | 0% | 10% | 20% | 30% | 40% | 50% | 60% | 70% | 80% | 90% | 100% |
|---|---|---|---|---|---|---|---|---|---|---|---|
| HYDROPHILIC TREATMENT SPACERS | 0% | 10% | 20% | 30% | 40% | 50% | 60% | 70% | 80% | 90% | 100% |
| HYDROPHOBIC TREATMENT SPACERS | 100% | 90% | 80% | 70% | 60% | 50% | 40% | 30% | 20% | 10% | 0% |
| ALIGNMENT DEFECT BETWEEN SPACERS | ◎ | ◎ | ◎ | ◎ | ◎ | ◎ | ○ | ○ | ○ | Δ | Δ |
| LEAKAGE OF LIGHT FROM PERIPHERY OF SPACER | X | Δ | ○ | ○ | ○ | ◎ | ◎ | ◎ | ◎ | ◎ | ◎ |
| PANEL GAP UNIFORMITY | ◎ | ◎ | ◎ | ◎ | ◎ | ◎ | ◎ | ◎ | ◎ | ◎ | ◎ |

※ SPACER DENSITY: 200 PIECES/mm²

An alignment defect between spacers is satisfactory when a mixing ratio of the hydrophilic spacers 10a and the hydrophobic spacers 10b is set so that a ratio of the hydrophilic spacers to the hydrophobic spacers is in a range from 0:100 to 50:50. A defective alignment 15 between spacers 10a and 10a becomes noticeable as a mixing ratio of the hydrophilic spacers 10a is increased further while a mixing ratio of the hydrophobic spacer 10b is reduced.

To be more concrete, when the hydrophilic spacers 10a account for 0 to 80% of all the spacers, it reaches a satisfactory display level or a display level needed for a practical use. Preferably, when the hydrophilic spacers 10a account for 0 to 50% of all the spacers, it reaches a satisfactory display level.

Leakage of light from the periphery of spacers is satisfactory when a mixing ratio of the hydrophilic spacers 10a and the hydrophobic spacers 10b is set so that a ratio of the hydrophilic spacers to the hydrophobic spacers is in a range from 100:0 to 50:50. It deteriorates when a mixing ratio of the hydrophilic spacers 10a is reduced while a mixing ratio of the hydrophobic spacers 10b is increased.

To be more concrete, when the hydrophobic spacers 10b account for more than 80% of all the spacers, it reaches too poor a display level for a practical use. Preferably, when the hydrophobic spacers 10b account for 0 to 50% of all the spacers, it reaches a satisfactory display level.

Because an overall density of the hydrophilic spacers 10a and the hydrophobic spacers 10b is set to be constant at 200 pieces/mm$^2$, the panel GAP uniformity is satisfactory on a whole range of a mixing ratio of the hydrophilic spacers 10a and the hydrophobic spacers 10b, that is, when a ratio of the hydrophilic spacers to the hydrophobic spacers is in a range from 0:100 to 100:0.

In view of the foregoing, an alignment defect between spacers, leakage of light from the periphery of spacers, the panel GAP uniformity are all satisfactory when a mixing ratio of the hydrophilic spacers 10a and the hydrophobic spacers 10b is set so that a ratio of the hydrophilic spacers to the hydrophobic spacers is in a range from 20:80 to 80:20. Preferably, the most satisfactory display level can be achieved when a mixing ratio of the hydrophilic spacers 10a with respect to all the spacers exceeds 40% and is less than 60%, and a mixing ratio of the hydrophobic spacers 10b with respect to all the spacers is less than 60% and exceeds 40%.

TABLE 12 compares roughness in the white display, roughness in the black display, an alignment defect between spacers, and the panel GAP uniformity when the hydrophilic spacers 10a and the hydrophobic spacers 10b were mixed so that each accounts for 50%, and substantially transparent spacers and substantially black spacers were mixed.

A base material of transparent spacers is formed by subjecting a monomer having unsaturated ethylene groups to suspension polymerization using a radical polymerizing agent. When transparent hydrophilic spacers are formed, they are formed by applying the alkyl treatment as described above.

Black spacers are obtained by mixing a black pigment with the monomer, or covering the periphery of the transparent base material with a black coating film. When black hydrophilic spacers are to be formed, they are formed by applying the alkyl treatment as described above.

When a mixing ratio of the transparent spacers and the black spacers is set so that a ratio of the transparent spacers to the black spacers is in a range from 0:100 to 10:90, no roughness is observed in the black display; however, roughness in the white display is deteriorated. When a ratio of the transparent spacers to the black spacers is in a range from 90:10 to 100:0, no roughness is observed in the white display; however, roughness in the black display is deteriorated.

When a ratio of the transparent spacers to the black spacers is in a range from 20:80 to 80:20, roughness in the white display and roughness in the black display both tend to improve. When a ratio of the transparent spacers to the black spacers is 50:50, roughness is improved most satisfactorily.

In view of the foregoing, it is possible to obtain a liquid crystal display device in which no alignment defect occurs between spaces and roughness in the white display and roughness in the black display are both satisfactory.

TABLE 13 compares roughness in the white display, roughness in the black display, an alignment defect between spacers, and the panel GAP uniformity when hydrophilic spacers and hydrophobic spacers were mixed at a ratio of 50%:50% and semi-transparent spacers were used.

TABLE 12

| | | | | | | | | | | | |
|---|---|---|---|---|---|---|---|---|---|---|---|
| RATIO OF TRANSPARENT SPACERS | 0% | 10% | 20% | 30% | 40% | 50% | 60% | 70% | 80% | 90% | 100% |
| RATIO OF BLACK SPACERS | 100% | 90% | 80% | 70% | 60% | 50% | 40% | 30% | 20% | 10% | 0% |
| ROUGHNESS IN WHITE DISPLAY | X | Δ | ○ | ○ | ○ | ◎ | ◎ | ◎ | ◎ | ◎ | ◎ |
| ROUGHNESS IN BLACK DISPLAY | ◎ | ◎ | ◎ | ◎ | ◎ | ◎ | ○ | ○ | ○ | Δ | X |
| ALIGNMENT DEFECT BETWEEN SPACERS | ◎ | ◎ | ◎ | ◎ | ◎ | ◎ | ◎ | ◎ | ◎ | ◎ | ◎ |
| PANEL GAP UNIFORMITY | ◎ | ◎ | ◎ | ◎ | ◎ | ◎ | ◎ | ◎ | ◎ | ◎ | ◎ |

※ SPACER DENSITY: 200 PIECES/mm$^2$

TABLE 13

| TRANSMITTANCE OF SEMI-TRANSPARENT SPACERS | 0% | 10% | 20% | 30% | 40% | 50% | 60% | 70% | 80% | 90% | 100% |
|---|---|---|---|---|---|---|---|---|---|---|---|
| ROUGHNESS IN WHITE DISPLAY | X | △ | ○ | ○ | ○ | ◎ | ◎ | ◎ | ◎ | ◎ | ◎ |
| ROUGHNESS IN BLACK DISPLAY | ◎ | ◎ | ◎ | ◎ | ◎ | ◎ | ○ | ○ | ○ | △ | X |
| ALIGNMENT DEFECT BETWEEN SPACERS | ◎ | ◎ | ◎ | ◎ | ◎ | ◎ | ◎ | ◎ | ◎ | ◎ | ◎ |
| PANEL GAP UNIFORMITY | ◎ | ◎ | ◎ | ◎ | ◎ | ◎ | ◎ | ◎ | ◎ | ◎ | ◎ |

※ SPACER DENSITY: 200 PIECES/mm$^2$

Semi-transmissive spacers are obtained by mixing a small quantity of a black pigment with a monomer having unsaturated ethylene groups, or by covering the periphery of a transparent base material slightly with a black coating film.

When transmittance of the semi-transparent spacers is in a range from 0% to 10%, no roughness is observed in the black display; however, roughness in the white display is deteriorated.

When transmittance of the semi-transparent spacers is in a range from 90% to 100%, no roughness is observed in the white display; however, roughness in the black display is deteriorated.

When transmittance of the semi-transparent spacers is in a range from 20% to 80%, roughness in the white display and roughness in the black display both tend to improve, and both are improved most satisfactorily when transmittance of semi-transparent spacers is 50%.

In view of the foregoing, it is possible to obtain a liquid crystal display device in which no alignment defect occurs between spacers and roughness in the white display and roughness in the black display are both satisfactory.

By forming a display body provided at least with the liquid crystal display panel DP having the spacers as described above and the backlight BL that are accommodated in a case container, and a driving circuit that provides a specific signal to the transparent electrodes 5 (or switching transistors), a satisfactory liquid crystal display having no alignment defect, no roughness in the white display, and no roughness in the black display is enabled.

While embodiments of the invention have been described, the invention is not limited to the embodiments above.

For example, the color filter 8 may be formed on the display substrate 4a side.

Also, the transparent electrodes 5b formed on the transparent substrate 4b may be formed in the form of a single transparent conducting film spread across plural pixel regions, so that the transparent electrodes 5a on the transparent substrate 4a having no color filter 8 are formed in a matrix fashion to correspond to respective pixel regions, and switching transistor elements are connected to the respective transparent electrodes 5a thus formed. In short, an active liquid crystal panel DP of a TFT type, a TFD type or the like can be used as well.

The invention claimed is:

1. A liquid crystal display device provided with a liquid crystal panel having plural pixel regions arrayed in a matrix fashion comprising:
   a first substrate on a display surface side, provided with a transparent conducting film and an alignment film;
   a second substrate disposed oppositely to the first substrate on a back surface side and provided with a transparent conducting film and an alignment film;
   a liquid crystal layer in a space between the two substrates;
   a reflection film provided on the second substrate;
   plural spacers in the space; and
   a backlight that supplies light to the pixel regions via the second substrate, wherein
   the reflection film has a light reflective region and a light transmissive region provided with a light transmission hole for each pixel region, and
   light transmittance of the plural spacers provided in the light transmissive region is in a range from 20 to 80%, wherein the spacers include black spacers and transparent spacers, and a mixing ratio of the black spacers and the transparent spacers is set in a range from 20:80 to 80:20.

2. The liquid crystal display device according to claim 1, wherein the spacers further include semi-transparent spacers.

3. The liquid crystal display device according to claim 1, wherein part of or all the black spacers are spacers subjected to hydrophilic treatment, each being made of a black base material particle and a hydrophilic group film deposited on a surface of the particle.

4. The liquid crystal display device according to claim 3, wherein an alkyl group film having up to 11 to 13 carbons is formed and deposited on a surface of the hydrophilic group film.

5. The A liquid crystal display panel having plural pixel regions arrayed in a matrix fashion comprising:
   a first substrate on a display surface side, provided with a transparent conducting film and an alignment film;
   a second substrate disposed oppositely to the first substrate on a back surface side and provided with a transparent conducting film and an alignment film;
   a liquid crystal layer in a space between the two substrates;
   a reflection film provided on the second substrate; and
   plural spacers in the space; wherein
   the reflection film has a light reflective region and a light transmissive region provided with a light transmission hole for each pixel region,
   the spacers comprise first spacers and second spacers both in the light transmissive region, the first and the second spacers having different light transmittance, and
   let r be a radius of the spacers and S be an area of the light transmissive region, and then $\pi r^2/S$ is set in a range from 0.001 to 0.01, wherein the first spacers are black spacers and the second spacers are transparent spacers, and a mixing ratio of the black spacers and the transparent spacers is set in a range from 20:80 to 80:20.

6. A liquid crystal display device provided with a liquid crystal panel having plural pixel regions arrayed in a matrix fashion comprising:
   a first substrate on a display surface side, provided with a transparent conducting film and an alignment film;
   a second substrate disposed oppositely to the first substrate on a back surface side and provided with a transparent conducting film and an alignment film;
   a liquid crystal layer in a space between the two substrates;
   a reflection film provided on the second substrate;
   plural spacers in the space; and
   a backlight that supplies light to the pixel regions via the second substrate, wherein the reflection film has a light reflective region and a light transmissive region provided with a light transmission hole for each pixel region, and let r be a radius of the spacers and S be an area of the light transmissive region, and then $\pi r^2/S$ is set in a range from 0.001 to 0.01, wherein the spacers include black spacers and transparent spacers, and a mixing ratio of the black spacers and the transparent spacers is set in a range from 20:80 to 80:20, wherein the spacers further include semi-transparent spacers.

7. A liquid crystal display device provided with a liquid crystal panel having plural pixel regions arrayed in a matrix fashion comprising:

a first substrate on a display surface side, provided with a transparent conducting film and an alignment film;

a second substrate disposed oppositely to the first substrate on a back surface side and provided with a transparent conducting film and an alignment film;

a liquid crystal layer in a space between the two substrates;

a reflection film provided on the second substrate;

plural spacers in the space; and a backlight that supplies light to the pixel regions via the second substrate, wherein the reflection film has a light reflective region and a light transmissive region provided with a light transmission hole for each pixel region, and let r be a radius of the spacers and S be an area of the light transmissive region, and then $\pi r^2/S$ is set in a range from 0.001 to 0.01, wherein the spacers include black spacers and transparent spacers, and a mixing ratio of the black spacers and the transparent spacers is set in a range from 20:80 to 80:20, wherein part of or all the black spacers are spacers subjected to hydrophilic treatment, each being made of a black base material particle and a hydrophilic group film deposited on a surface of the particle.

8. The liquid crystal display device according to claim 7, wherein an alkyl group film having up to 11 to 13 carbons is formed and deposited on a surface of the hydrophilic group film.

9. The A liquid crystal display panel having plural pixel regions arrayed in a matrix fashion comprising:

a first substrate on a display surface side, provided with a transparent conducting film and an alignment film;

a second substrate disposed oppositely to the first substrate on a back surface side and provided with a transparent conducting film and an alignment film;

a liquid crystal layer in a space between the two substrates;

a reflection film provided on the second substrate; and plural spacers in the space;

wherein the reflection film has a light reflective region and a light transmissive region provided with a light transmission hole for each pixel region, light transmittance of the plural spacers provided in the light transmissive region is in a range from 20 to 80%, and the spacers comprise first spacers and second spacers both in the light transmissive region, the first and the second spacers having different light transmittance, wherein the first and the second spacers are different in color, wherein the first spacers are black spacers and the second spacers are transparent spacers.

10. A liquid crystal display panel having plural pixel regions arrayed in a matrix fashion comprising:

a first substrate on a display surface side, provided with a transparent conducting film and an alignment film;

a second substrate disposed oppositely to the first substrate on a back surface side and provided with a transparent conducting film and an alignment film;

a liquid crystal layer in a space between the two substrates;

a reflection film provided on the second substrate; and plural spacers in the space; wherein the reflection film has a light reflective region and a light transmissive region provided with a light transmission hole for each pixel region, the spacers comprise first spacers and second spacers both in the light transmissive region, the first and the second spacers having different light transmittance, and let r be a radius of the spacers and S be an area of the light transmissive region, and then $\pi r^2/S$ is set in a range from 0.001 to 0.01, wherein the first and the second spacers are different in color, wherein the first spacers are black spacers and the second spacers are transparent spacers.

* * * * *